United States Patent
Soler et al.

(10) Patent No.: US 11,212,890 B2
(45) Date of Patent: Dec. 28, 2021

(54) DUAL-MODE SPECTRAL DIMMING LIGHTING SYSTEM

(71) Applicant: Biological Innovation and Optimization Systems, LLC, Carlsbad, CA (US)

(72) Inventors: Robert Soler, San Marcos, CA (US); Eric Schafer, Carlsbad, CA (US); Abhishek Goyanka, Irving, TX (US)

(73) Assignee: Biological Innovation and Optimization Systems, LLC, Carlsbad, CA (US)

( * ) Notice: Subject to any disclaimer, the term of this patent is extended or adjusted under 35 U.S.C. 154(b) by 0 days.

(21) Appl. No.: 16/949,525

(22) Filed: Nov. 2, 2020

(65) Prior Publication Data
US 2021/0051779 A1 Feb. 18, 2021

Related U.S. Application Data

(63) Continuation-in-part of application No. 16/543,232, filed on Aug. 16, 2019, now Pat. No. 10,827,579, (Continued)

(51) Int. Cl.
*H05B 45/10* (2020.01)
*H05B 45/20* (2020.01)
*G06F 3/0484* (2013.01)

(52) U.S. Cl.
CPC ......... *H05B 45/20* (2020.01); *G06F 3/04847* (2013.01); *H05B 45/10* (2020.01)

(58) Field of Classification Search
CPC ........ H05B 45/10; H05B 45/20; H05B 45/46; H05B 45/40; H05B 47/16; G06F 3/04847; Y02B 20/40
See application file for complete search history.

(56) References Cited

U.S. PATENT DOCUMENTS

| | | |
|---|---|---|
| 6,965,205 B2 | 11/2005 | Piepgras et al. |
| 7,015,636 B2 | 3/2006 | Bolta |

(Continued)

FOREIGN PATENT DOCUMENTS

| | | |
|---|---|---|
| CN | 109069851 A | 12/2018 |
| WO | 2013162308 A1 | 10/2013 |

(Continued)

OTHER PUBLICATIONS

Demarsy, Emily et al, Higher plants use LOV to perceive blue light, Feb. 2009, 22 pgs, vol. 12, Current opinion in plant biology, Lausanne, Switzerland.

(Continued)

*Primary Examiner* — Haissa Philogene
(74) *Attorney, Agent, or Firm* — MLO, a professional corp.

(57) ABSTRACT

Lighting control systems are disclosed, which are configured to detect a rate at which a total current from a current driver is being changed. The total current is an amount of current for a plurality of LED channels comprising a first LED channel and a second LED channel. The systems are also configured to control a first current to the first LED channel and a second current to the second LED channel, the first current and the second current each being a portion of the total current. The controlling comprises: when the rate is detected as being a first slope, changing a ratio of the second current to the first current; and when the rate is detected as being a second slope different from the first slope, keeping the ratio constant while the total current is adjusted according to the dimmer control.

21 Claims, 16 Drawing Sheets

Related U.S. Application Data which is a continuation of application No. 16/257,970, filed on Jan. 25, 2019, now Pat. No. 10,420,184.

(56) References Cited

U.S. PATENT DOCUMENTS

| | | | |
|---|---|---|---|
| 7,256,557 B2 | 8/2007 | Lim et al. | |
| 7,923,935 B2 | 4/2011 | Archenhold et al. | |
| 8,344,656 B2 * | 1/2013 | Du | H05B 45/345 |
| | | | 315/297 |
| 8,436,556 B2 | 5/2013 | Eisele et al. | |
| 8,456,109 B1 * | 6/2013 | Wray | H05B 45/3577 |
| | | | 315/307 |
| 8,876,313 B2 | 11/2014 | Grajcar | |
| 9,313,856 B2 | 4/2016 | Saffari et al. | |
| 9,410,664 B2 | 8/2016 | Krames et al. | |
| 9,655,184 B2 * | 5/2017 | Guo | H05B 45/395 |
| 9,788,387 B2 | 10/2017 | Soler et al. | |
| 9,795,000 B1 | 10/2017 | Sooch et al. | |
| 9,827,439 B2 | 11/2017 | Maxik et al. | |
| 9,924,574 B1 | 3/2018 | Fernandez et al. | |
| 9,936,557 B1 | 4/2018 | Janik et al. | |
| 10,004,122 B1 | 6/2018 | Li et al. | |
| 10,022,556 B1 | 7/2018 | Holbert et al. | |
| 10,113,700 B2 | 10/2018 | Soer et al. | |
| 10,143,058 B2 | 11/2018 | DeMayo et al. | |
| 10,212,766 B2 | 2/2019 | Gordin et al. | |
| 10,420,184 B1 | 9/2019 | Soler et al. | |
| 10,652,962 B1 * | 5/2020 | Qiu | H05B 45/20 |
| 10,674,579 B2 * | 6/2020 | Bruckner | H05B 45/37 |
| 2004/0052076 A1 | 3/2004 | Mueller et al. | |
| 2013/0320862 A1 | 12/2013 | Campbell et al. | |
| 2014/0306620 A1 | 10/2014 | Maxik et al. | |
| 2015/0327342 A1 | 11/2015 | Lu et al. | |
| 2016/0195227 A1 | 7/2016 | Rooijmans | |
| 2017/0189640 A1 | 7/2017 | Sadwick | |
| 2017/0259079 A1 | 9/2017 | Grajcar et al. | |
| 2017/0325310 A1 | 11/2017 | Chen et al. | |
| 2017/0348506 A1 | 12/2017 | Berman et al. | |
| 2018/0043130 A1 | 2/2018 | Moore-Ede et al. | |
| 2018/0056027 A1 | 3/2018 | Peeters et al. | |
| 2018/0063930 A1 | 3/2018 | Trice et al. | |
| 2018/0070421 A1 | 3/2018 | Soler et al. | |
| 2018/0073689 A1 | 3/2018 | Soer et al. | |
| 2018/0077767 A1 | 3/2018 | Soler et al. | |
| 2018/0077783 A1 | 3/2018 | Sooch et al. | |
| 2018/0177017 A1 | 6/2018 | Soler et al. | |
| 2018/0338359 A1 | 11/2018 | Soler | |

FOREIGN PATENT DOCUMENTS

| | | |
|---|---|---|
| WO | 2016058846 A1 | 4/2016 |
| WO | 2017106759 A4 | 9/2017 |

OTHER PUBLICATIONS

Deng, et al, Twilight, a Novel Circadian-Regulated Gene, Integrates Phototropism with Nutrient and Redox Homeostasis during Fungal Development, Jun. 23, 2015, 22 pgs, PLOS Pathogens, China.

Franklin, Keara A., Photomorphogenesis: Plants Feel Blue in the Shade, CellPress, Dec. 19, 2016, 2 pgs, School of Biological Sciences, University of Bristol, Tyndall Avenue, Bristol, UK.

Shinkle, James R., Photobiology of Phytochrome-Mediated Growth Responses in Sections of Stem Tissue from Etiolated Oats and Corn, Jan. 10, 1986, 5 pgs, Carnegie Institution of Washington—Department of Plant Biology, Berkeley, CA.

International Search Report dated Apr. 28, 2020 for PCT Patent Application No. PCT/IB2020/050319.

Notice of Allowance dated Jun. 22, 2020 for U.S. Appl. No. 16/543,232.

Notice of Allowance dated May 15, 2019 for U.S. Appl. No. 16/257,970.

Office Action dated Oct. 31, 2019 for U.S. Appl. No. 16/543,232.

* cited by examiner

DUAL-MODE SPECTRAL DIMMING LIGHTING SYSTEM

RELATED APPLICATIONS

This application is a continuation-in-part of U.S. patent application Ser. No. 16/543,232, filed on Aug. 16, 2019 and entitled "Bio-Dimming Lighting System"; which is a continuation of U.S. patent application Ser. No. 16/257,970, filed on Jan. 25, 2019, entitled "Bio-Dimming Lighting System" and issued as U.S. Pat. No. 10,420,184; all of which are hereby incorporated by reference in their entirety.

BACKGROUND

Light emitting diode (LED) technology is a maturing technology that continues to show improvements in efficiency, customability and cost reduction. LED technology is rapidly being deployed in a host of industries and markets including general lighting for homes, offices, and transportation, solid state display lighting such as in LCDs, aviation, agricultural, medical, and other fields of application. The increased energy efficiency of LED technology compared with other lighting solutions coupled with the reduction of costs of LED themselves are increasing the number of LED applications and rates of adoption across industries. While LED technology promises greater reliability, longer lifetimes and greater efficiencies than other lighting technologies, the ability to mix and independently drive different color LEDs to produce customized and dynamic light output makes LED technology and solid-state lighting (SSL) in general robust platforms to meet the demands of a variety of market needs and opens the door to many new applications of these lighting technologies.

Melanopsin is a type of photopigment belonging to a larger family of light-sensitive retinal proteins called opsins and is found in intrinsically photosensitive retinal ganglion cells (ipRGCs) of humans and other mammals. Melanopsin plays an important non-image-forming role in the photoentrainment of circadian rhythms as well as potentially many other physiologic functions. Stimulation of melanopsin-containing ipRGCs contributes to various reflexive responses of the brain and body to the presence of light. Melanopsin photoreceptors are sensitive to a range of wavelengths and reach peak light absorption at wavelengths around 480-500 (or 490) nanometers (nm). Melanopic light, that is light corresponding to the melanopsin action spectrum, including particularly the wavelengths in the 480-500 nm region, is important for non-visual stimuli including physiological and neurological effects such as pupillary light reflex and circadian entrainment and/or disruption. Time-coordinated exposure, including over-exposure and under-exposure to melanopic light, can be used to entrain and facilitate healthy circadian rhythms in humans and other mammals.

Circadian related photoreceptors are in the macular and peripheral vision regions of the retina. Melanopsin related photoreceptors are most sensitive in the lower hemisphere of the retina. Selective stimulation of these photoreceptors is possible by directing illumination, and specifically melanopic light, towards or away from the region of the retina where melanopic photoreceptors are most concentrated or most sensitive or responsive. If the desire is to optimally stimulate these photoreceptors, then a light source that directs biological light (i.e., melanopic light) onto this region would be a good solution. Equivalent Melanopic Lux (EML) is a metric for measuring the biological effects of light on humans. EML as a metric is weighted to the ipRGCs response to light and translates how much the spectrum of a light source stimulates ipRGCs and affects the circadian system. Melanopic ratio is the ratio of melanopic lux to photopic lux for a given light source.

While it is well known that exposure to light, both natural and artificial, can affect an individual's circadian rhythms, studies also indicate that the natural light of the sky during twilight, that is the short period around dawn or dusk when the sun is near the horizon, may have a significant impact on circadian drive and/or the gating of sleep pressure. Although the sky appears deep blue during twilight, it has significantly less radiant energy in the melanopic region (e.g., 490 nm) and significantly higher radiant energy in the 420 nm region, as compared to the sky during midday.

Scientific data indicates that the suprachiasmatic nucleus contains color representation of the sensed color of light. During the vast majority of the daytime, when the sun is up, the color temperature of the sky is between 5500 K and 7000 K. The only time when this changes is during twilight periods when the sun is low. Common perception suggests that at these times the sky gets redder. However, this is not the case, and while the sun appears redder as its irradiance travels through more of our earth's atmosphere, in fact the sky gets much bluer (e.g., at twilight, the color temperature of the sky may be at 8000-9000 K).

There are two unique and compelling circadian phenomena which coincide with the time when the sky gets bluer. First, sleep inertia, which is the tendency for humans to remain asleep, occurs during sleep. Upon wakening, a circadian-driven surge in blood cortisol levels helps individuals to wake up refreshed by mitigating sleep inertia. This cortisol response has been shown to synergistically occur with presence of light. On the other end of the day, e.g., at sunset, the wake maintenance zone portion of the circadian cycle has been demonstrated as a point of hyperactivity and enhanced neurobiological activity. It is hypothesized that this heightened activity may be an evolutionary survival response to ensure that individuals have sufficient alertness and energy to complete any tasks and find safety prior to the onset of darkness. At the time of day around twilight (or equivalent point in a circadian photoperiod) the human neurophysiology may be affected by specific light cues (that occur only at twilight) with regard to the body's circadian rhythm. For example, one effect may be the initiation of a sleep gating process or conversely the absence or reduction of such gating without exposure to the twilight.

Plants also exhibit circadian behavior, having circadian rhythms of stomatal opening, nutrient content, aroma and leaf rigidity. Stomates open and close according to the time of day, with a peak in activity during the middle of the day. The rigidity of leaves changes over the course of the day such that leaves droop in the middle of the night and become rigid during the day, particularly at the beginning of the day. The chemical composition of plants changes over the course of the day to fight off predatory insects at times that these predators are most prevalent. Plants also change their aromas over the course of the day to attract pollinators at times that these pollinators are most prevalent.

The ability to control the circadian spectra and color temperatures of light during dimming of LED fixtures, such as in response to an environmental cue or to human preference, has been implemented in some systems. For example, systems have been disclosed in which a user can control the amount of circadian stimulation depending on the time of day or based on certain activities such as working late or jet-lag. Existing systems often include individual controllers to adjust the color temperature of the light and overall brightness such as through dimmers. Systems also have included learning modes to understand a user's habits during the day or to learn behavior according to certain activity cues.

SUMMARY

In some embodiments, a lighting control system has an electronic processing circuit that is configured to detect a rate at which a total current from a current driver is being changed, where the total current is an amount of current for a plurality of light emitting diode (LED) channels. The plurality of LED channels includes a first LED channel and a second LED channel. The electronic processing circuit is also configured to control a first current to the first LED channel and a second current to the second LED channel, the first current and the second current each being a portion of the total current. The controlling comprises: i) when the rate is detected as being a first slope, changing a ratio of the second current to the first current; and ii) when the rate is detected as being a second slope different from the first slope, keeping the ratio constant while the total current is adjusted according to a dimmer control. The first slope and the second slope are pre-established values.

In some embodiments, a method for a lighting control system includes providing an electronic processing circuit and configuring the electronic processing circuit. The electronic processing circuit is configured to detect a rate at which a total current from a current driver is being changed, where the total current is an amount of current for a plurality of LED channels. The plurality of LED channels includes a first LED channel and a second LED channel. The electronic processing circuit is also configured to control a first current to the first LED channel and a second current to the second LED channel, the first current and the second current each being a portion of the total current. The controlling comprises: i) when the rate is detected as being a first slope, changing a ratio of the second current to the first current; and ii) when the rate is detected as being a second slope different from the first slope, keeping the ratio constant while the total current is adjusted according to a dimmer control. The first slope and the second slope are pre-established values.

In some embodiments, a lighting control system includes a mode selection switch, a dimmer control, a controller and an electronic processing circuit. The mode selection switch allows a user to turn a spectrum mode on and off. The dimmer control allows the user to adjust an overall amount of light output from a light engine, the light engine comprising a first LED channel and a second LED channel. The controller is connected to the mode selection switch and to the dimmer control. The controller outputs a control signal to a current driver, the control signal having a first slope when the mode selection switch is changed between on and off and having a second slope when the dimmer control is adjusted. The first slope is different from the second slope. The current driver receives the control signal from the controller and outputs a total current to the electronic processing circuit, where the current driver changes the total current at a rate according to the first slope or the second slope based on the control signal. The electronic processing circuit detects the rate at which the total current from the current driver is being changed; and controls a first current to the first LED channel and a second current to the second LED channel. The first current and the second current are each a portion of the total current. The controlling comprises i) when the rate is detected as being the first slope, changing a ratio of the second current to the first current, and ii) when the rate is detected as being the second slope, keeping the ratio constant while the total current is adjusted according to the dimmer control.

DETAILED DESCRIPTION

Figure 1:
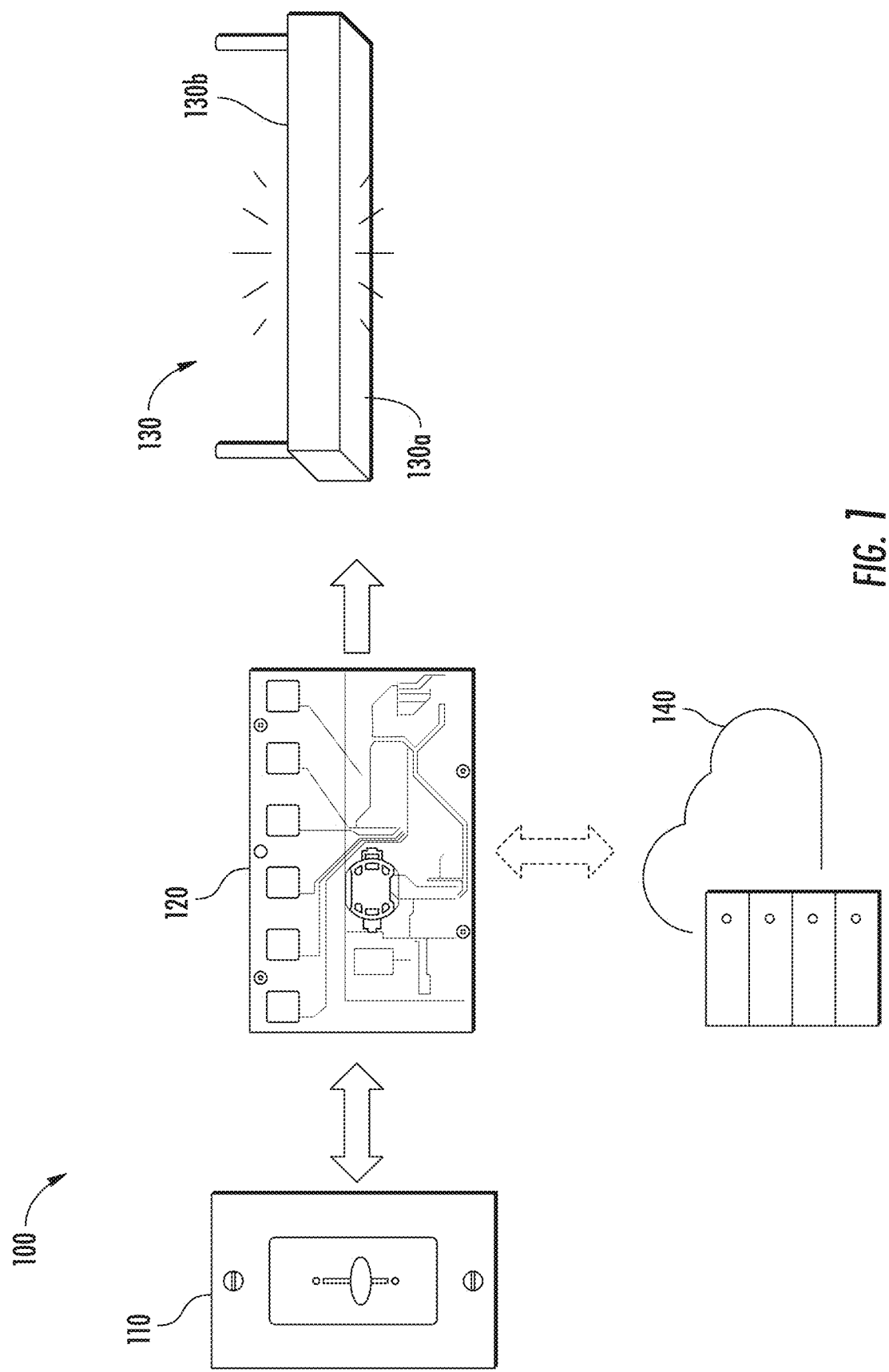
FIG. 1 is a schematic diagram of a lighting control system, in accordance with some embodiments.

Lighting systems are disclosed that provide biological light using a dimming profile and a maximum output that is tailored to a user's preferences. The maximum output may also be referred to as a maximum setpoint or a setpoint in this disclosure, where the setpoint defines the highest electrical current that will be utilized by LEDs in the lighting system. Systems beneficially adjust the setpoint according to the user's preferences in an easy-to-use and stable manner, allowing periodic adjustments to the light through a single dimmer control without erratically changing the setpoint. The biological light is also improved over conventional systems by incorporating multiple wavelengths that play a role in circadian entrainment and by enabling spatial distributions that further enhance circadian response. For example, embodiments of the present lighting systems can include biological wavelengths such as one or more of: melanopic light (approximately 490 nm) which targets the photoreceptor OPN4, sub-dermal stimulation light (e.g., approximately 660 nm and greater than approximately 700 nm (far-red)), violet light (approximately 380 nm) which targets the photoreceptor OPN5 and has been found in recent studies to play a role in circadian entrainment, and far-red light (700 nm to 800 nm) and/or blue light (400 nm to 500 nm) for plant growth. The biological dimming profiles change the proportions of biological light as the light is dimmed, such as by changing a ratio of melanopic light to photopic light and/or changing a ratio of OPN5- to OPN4- targeted light. Additionally, the lighting systems decrease biological light without compromising the visual light output (e.g., lumen output and/or color temperature) when the light is in a high output range.

Lighting systems are also disclosed that enable dimming with two different spectrums of light, where the system automatically detects whether a spectrum change or an intensity change (moving a dimming control) has been made by a user. In embodiments, a spectrum mode includes biologically tailored light, where turning off the spectrum mode causes the biologically tailored light to be changed to a different biological spectrum, or reduced within the spectrum, or removed. The lighting system detects whether the spectrum mode or intensity has been changed by utilizing particular slope rates at which electrical current is supplied to an electronic processing circuit that controls LED channels of the lighting system. These dual-mode spectral dimming lighting systems are beneficially compatible with conventional dimming control switches while providing new functionality where spectrums having different proportions of biological light can be implemented.

The term "electronic processing circuit" used herein may apply to microprocessors, microcontrollers, or field programmable gate arrays (FPGAs). For example, although some embodiments may be described in terms of a microprocessor, those embodiments may also utilize a microcontroller or an FPGA.

Dimming Control

FIG. 1 is a schematic diagram of a lighting control system 100, in accordance with some embodiments. Lighting control system 100 includes a dimmer control 110 that interacts with a microprocessor 120 to control the amount of light that is output by a lighting fixture 130. Dimmer control 110 is adjusted by a user and is shown as a slider interface in this embodiment but may be configured in other forms such as, but not limited to, a rotating knob, a pivoting lever or a touch screen, where the touch screen may have any user interface design. The dimmer control 110 may provide continuously adjustable positions or may have stepped increments. Lighting fixture 130 is shown as a multi-directional fixture in this embodiment, having both direct pendant 130a and indirect pendant 130b to provide downlighting and uplighting, respectively. In other embodiments the lighting fixture 130 may be configured to provide only direct or only indirect lighting, and can take any form (e.g., coves, recessed, sconces, pendants). The lighting fixture 130 includes multiple LED modules (not shown) to deliver white light and various wavelengths having biological significance, as shall be described in more detail later in this disclosure. In some embodiments, lighting system 100 can also include a controller 140 in communication with the microprocessor 120, where the controller 140 may be a local computer hardware processor or a cloud-based processing system. The controller 140 may serve as a building automation system and may be used to compute, process, and/or store data from the lighting fixture such as measurements of electrical current in the LEDs, rates of changes, time points at which changes occur, and duration of dimming adjustments. Thus, functions described as being performed by the microprocessor in this disclosure may by performed by the controller as well. In other embodiments, the computation, processing, and storing of data may all be performed locally by the microprocessor 120.

Figure 2:
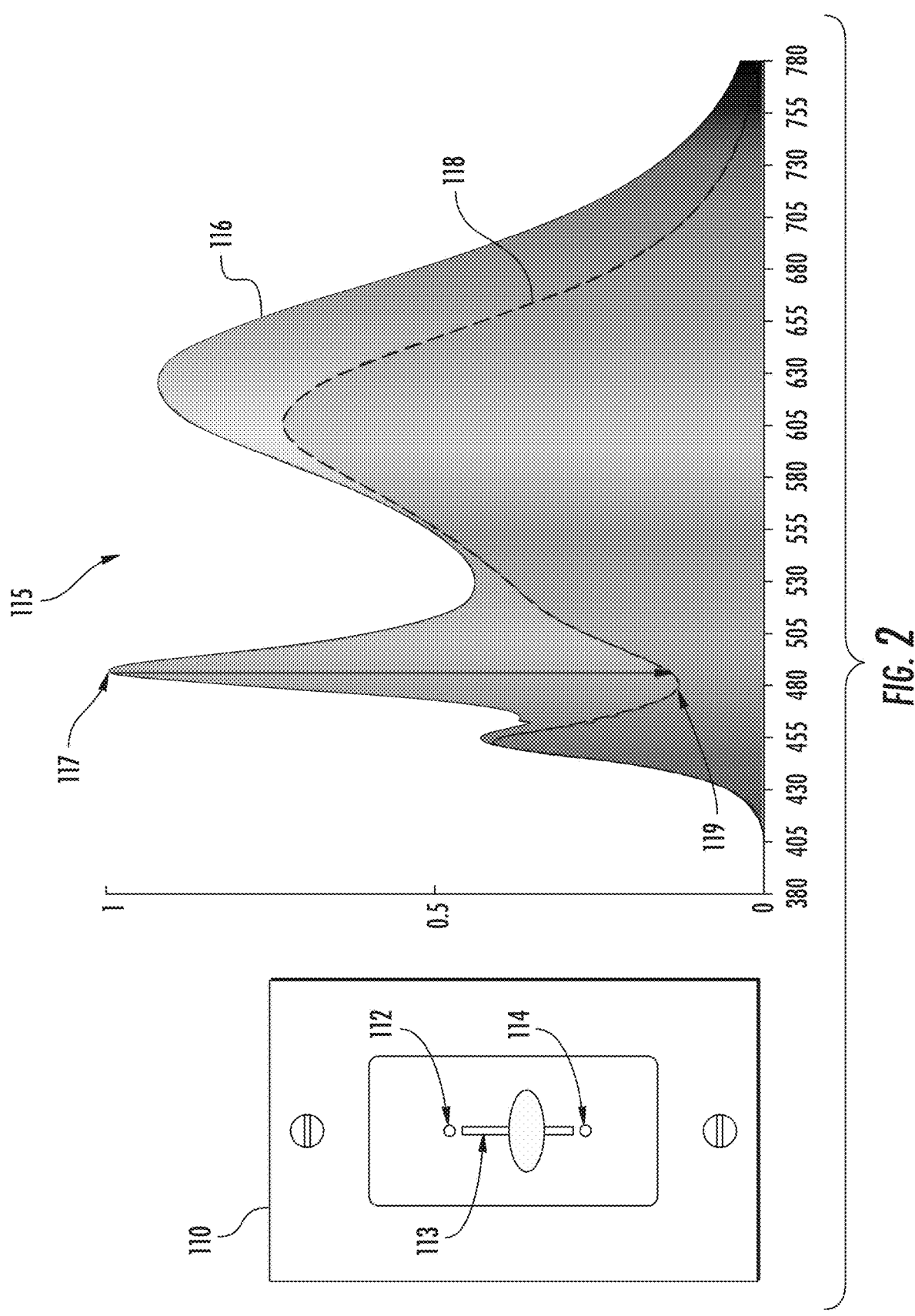
FIG. 2 shows a dimmer control and an associated dimming profile, in accordance with some embodiments.

FIG. 2 is an illustration demonstrating embodiments in which the dimmer control 110 integrates the adjustability of overall light levels as well as a biological dimming profile of the lighting system 100 into a single control. The lighting system uniquely marries psychology (i.e., user preferences) with biological benefits to deliver an overall dimming profile that provides brighter days and darker nights, as in the natural cycle of sunlight. In the embodiment of a spectral distribution graph 115 shown in FIG. 2, the system delivers a high amount of light in the peak melanopsin sensitivity range during the day and reduces the melanopic light at night. For example, a user may use a high dimmer setting, such as setting 112 of dimmer control 110, to deliver the spectral distribution 116 of graph 115. The spectral distribution 116 contains a high amount of melanopic light as indicated by the peak at approximately 490 nm indicated by point 117. Moving the dimmer control 110 to a lower setting 114 causes the spectral distribution 118 to be delivered, where the amount of melanopic light is greatly reduced to point 119. At the same time, the dimmer control 110 enables a user to adjust the maximum overall light output of the lighting system. The system learns the highest level of light that is comfortable for the user by monitoring the lighting levels and durations that are utilized by the user. For example, if a user frequently maintains the dimmer at a setting 113 that is less than the highest setting 112, the lighting system will define a setpoint with a maximum current corresponding to setting 113. Thus, the present lighting systems and methods beneficially provide dual functions in a single dimming interface—allowing a user to dim levels of biological light as well as automatically adapting to a user's preferences of maximum light levels.

Figure 3A:
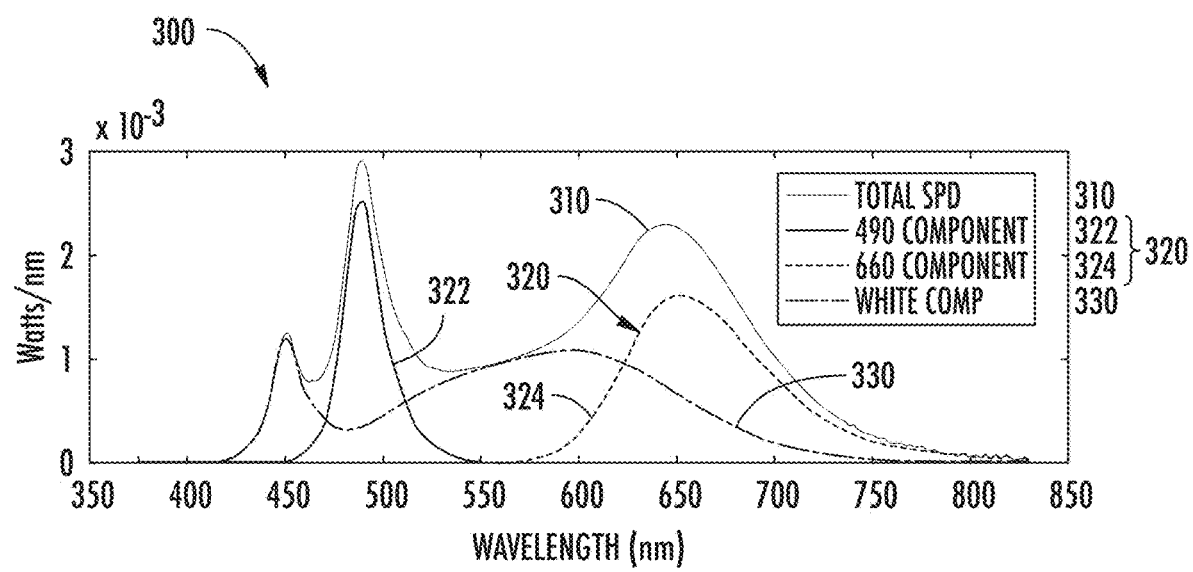
FIG. 3A is a graph of spectrum containing biological light, in accordance with some embodiments.
Figure 3B:
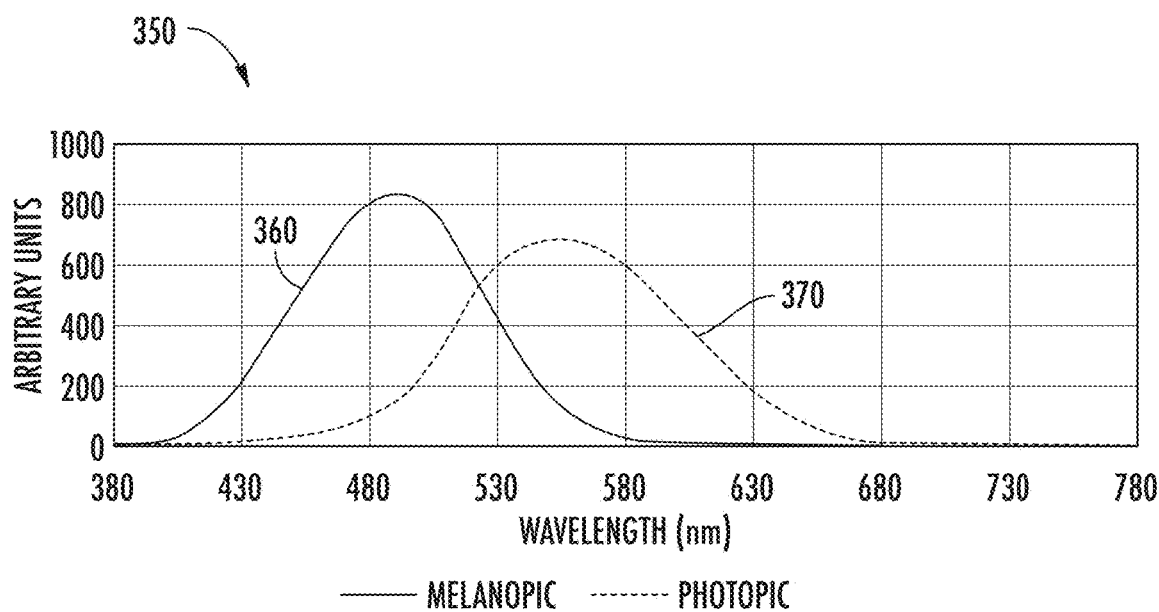
FIG. 3B is a graph of melanopic and photopic weighting functions for calculating a melanopic to photopic ratio, in accordance with some embodiments.

FIG. 3A shows a graph 300 representing an example embodiment of a spectrum containing biological light that may be delivered in the lighting systems of the present disclosure. In FIG. 3A, the y-axis is watts, and the x-axis is the wavelength in nanometers. The graph 300 shows a total spectral output 310 (i.e., spectral power distribution) that is a combination of traditional white light spectrum 330 and biological light 320. Biological light 320 includes wavelength peaks at 490 nm (curve 322) and 660 nm (curve 324) which may be emitted together from an LED module (or chip or channel) that shall be referred to in this disclosure as a SKYBLUE® supplement. In this disclosure, the relative amount of melanopic light in the spectrum that is being output by the lighting system shall be referred to as a melanopic to photopic (M/P) ratio. The M/P ratio is a melanopic lux per photopic lux, which is also known as an equivalent melanopic lux (EML). Specifically, the M/P ratio in this disclosure is calculated using weighting functions such as shown in FIG. 3B, which provide weighting based on photoreceptor sensitivity. These weighting functions are normalized to have equal area under the curve, but are not appropriately scaled relative to one another in this graph. Curve 360 is a weighting function that represents melanopsin sensitivity and is a wavelength distribution centered around approximately 490 nm. Curve 370 is a weighting function that represents photopic sensitivity and is a wavelength distribution centered around approximately 555 nm. The melanopic lux "M" is calculated as the dot product of the total spectral output 310 and the M weighting function, curve 360, while the photopic lux "P" is calculated as the dot product of the total spectral output 310 and the P weighting function, curve 370. The M/P ratio is then calculated as M divided by P. The weighting functions of curve 360 and curve 370 do not have equal sensitivity and are normalized such that if curve 360 and curve 370 were equal energy spectra, the M/P ratio would be 1. For example, in this embodiment, the y-axis of FIG. 3B is shown in arbitrary units that have weights of 683 for the photopic curve 370 (which corresponds to the number of lumens per watt at 555 nm) and 72,983 for the melanopic curve 360 (where the units are chosen to balance the curves 360 and 370 to have an M/P ratio of 1 at equal energy spectra).

In further embodiments, the biological light is adjusted by controlling a ratio of OPN5-targeted light to OPN4-targeted light, where an OPN5/OPN4 ratio is a ratio of an OPN5 lux to a melanopic lux. The melanopic lux is calculated as the dot product of the total spectral output and an M weighting function as described above, and the OPN5 lux is similarly calculated as the dot product of the total spectral output and an OPN5 weighting function. The OPN5/OPN4 ratio is controlled according to the dimming profile, where the dimming profile correlates the OPN5/OPN4 ratio to a percentage of the maximum current. In certain embodiments, a minimum OPN5/OPN4 ratio is output when the total current is equal to or greater than the setpoint, such that the OPN5/OPN4 ratio increases as the current is decreased. That is, at full output the system delivers a low amount of OPN5, and as the system is dimmed, the proportion of the lighting system's total current that is being delivered to an LED channel emitting OPN5-targeted light (e.g., 370 nm to 410 nm) increases compared to proportion of the total current to an LED channel emitting OPN4-targeted light (e.g., melanopic 480 nm to 500 nm).

Lighting systems of the present disclosure adjust the biological light, such as the M/P ratio or OPN5/OPN4 ratio, via dimming interfaces such as dimmer control 110 of FIG. 1. Dimming systems in accordance with some embodiments of the present disclosure are agnostic of the type of dimming interface being used and can be utilized with various types of dimmers such as, but not limited to, 0-10V, digital addressable lighting interface (DALI), electronic low voltage (ELV), or digital multiplex (DMX) types. The dimming can be performed either automatically or manually, such as automatically according to a time of day or manually as the user dims the light output during the course of the day. In some embodiments, the system may default to delivering certain biological light ratios according to the time of day (i.e., daylight level outputs during the morning and afternoon, and gradually dimming to nighttime levels according to sunset timing for that geographical area) while allowing a user to override the lighting level for a period of time by manually adjust the dimming level. For example, a user may temporarily increase the lighting level in an office space when they are working late, which will override the M/P (or OPN5/OPN4) ratio and the lighting level that would be delivered according to the time of day for the dimming profile.

The electrical current applied to an LED determines its brightness. Conventionally, luminaires or light fixtures oftentimes are configured to be too bright at the time of installation. Thus, the user's desired lighting level often needs to be established in the field, where a dimmer is used to achieve comfortable lighting if the levels are too bright. In conventional systems where a dimmer is used to reduce the amount of biological light, if a user dims the light for preference, then the lighting system will provide a lower biological light ratio than what was originally designed. In contrast, embodiments of the present disclosure utilize a unique machine learning algorithm to develop an understanding of the maximum lighting level—that is, a setpoint—preferred by the user(s). The maximum lighting level is determined by measuring the electrical current to the lighting fixture (total current to all LEDs in the fixture) over time, from which the algorithm derives the setpoint. The electrical current corresponding to the setpoint is the maximum current that will be used in the dimming profile for the lighting fixture, where the dimming profile relates the biological light ratio to a percentage of the maximum current. That is, the M/P ratio or OPN5/OPN4 ratio is adjusted as the user or the system dims the light level during the day, where the change in ratio is scaled to the maximum current corresponding to the setpoint rather than by being determined by an absolute value of electrical current as in conventional systems. When the electrical current being used at a particular time is equal to or greater than the setpoint (e.g., if the user temporarily increases the dimmer higher than the setpoint), the maximum biological light ratio will be delivered and will not exceed the maximum prescribed biological light ratio of the diming profile.

In some embodiments, each percentage output (e.g., 10% of maximum current, 20%, 30%, etc.) of the dimming profile has a corresponding biological light ratio that will be delivered. If the setpoint is changed, as manually adjusted by the user and learned by the system to be an actual desired change, the percentage outputs will be scaled to that new setpoint, and the corresponding biological light ratios will be delivered at those percentage outputs of the setpoint. For instance, in one scenario using M/P ratio as an example, the lighting system may have a total rated forward current of 0.5 A and the dimming profile is designed to deliver a particular nighttime M/P ratio at 30% of the maximum current (i.e., at 0.15 A). If the system determines that the user prefers 0.4 A as the maximum lighting level, then the system will deliver the particular nighttime M/P ratio at 0.12 A which is 30% of the new setpoint (0.4 A). The re-scaling by the system of the dimming profile according to the maximum light level preferred by the user enables both the biological light and the overall lighting output of the system to be controlled by a single dimmer control, which improves ease-of-use compared to conventional systems.

Biological light and white light may have different efficacies. For example, the melanopic lumens per electrical watt of the biological light 320 in FIG. 3A may be different from the photopic lumens per electrical watt of the white light spectrum 330. In some embodiments, the dimming profiles of the present disclosure uniquely account for these differences in efficacies. In one example embodiment, the photopic lumens per watt are higher in the white light than in the biological light. Consequently, in a dimming profile that removes the biological light first, the photopic lumens remains fairly constant since the biological light is less efficient than the white light. In other words, embodiments of the present systems and methods beneficially consider the efficacies of specific light spectra such that, for example, wavelengths of blue light (e.g., melanopic) can be dimmed first without affecting the photopic lumens.

Figure 4A:
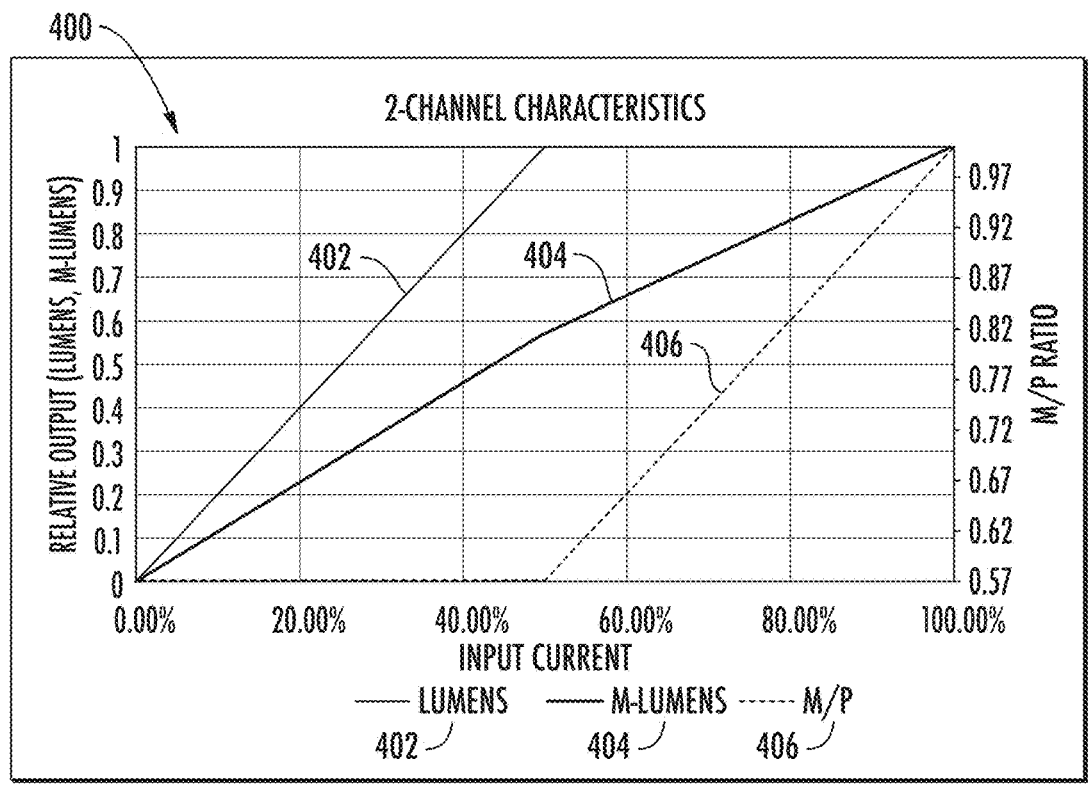
FIGS. 4A-4D are graphs representing dimming profiles as a function of input current, in accordance with some embodiments.
Figure 4B:
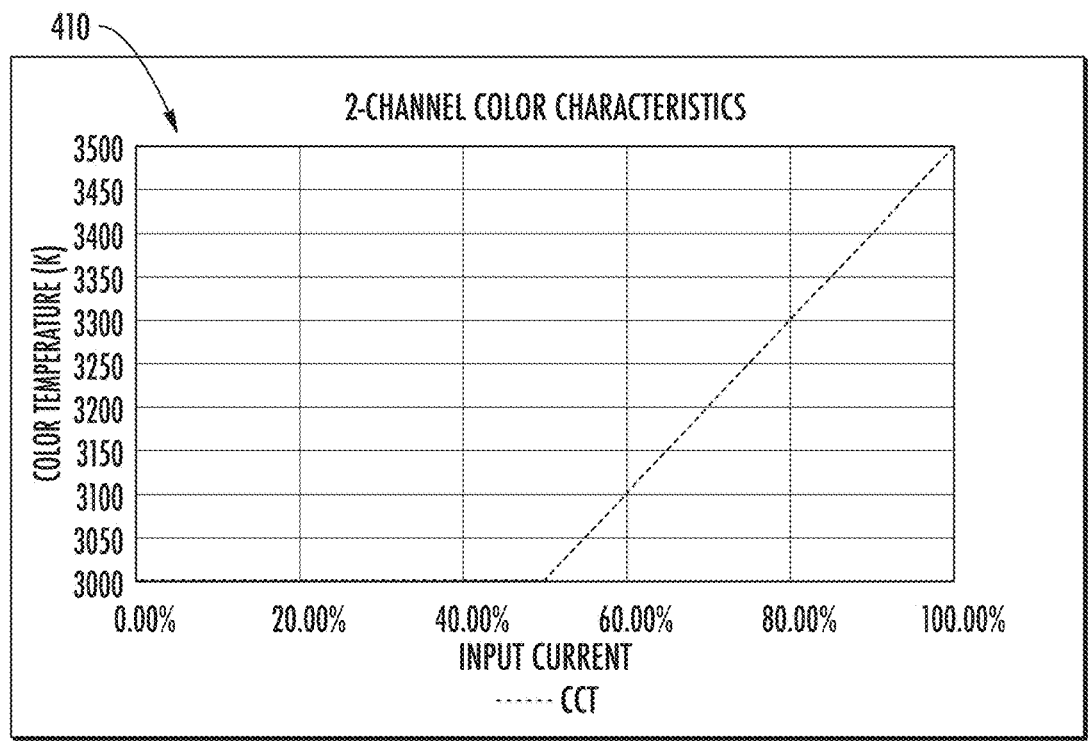
Figure 4C:
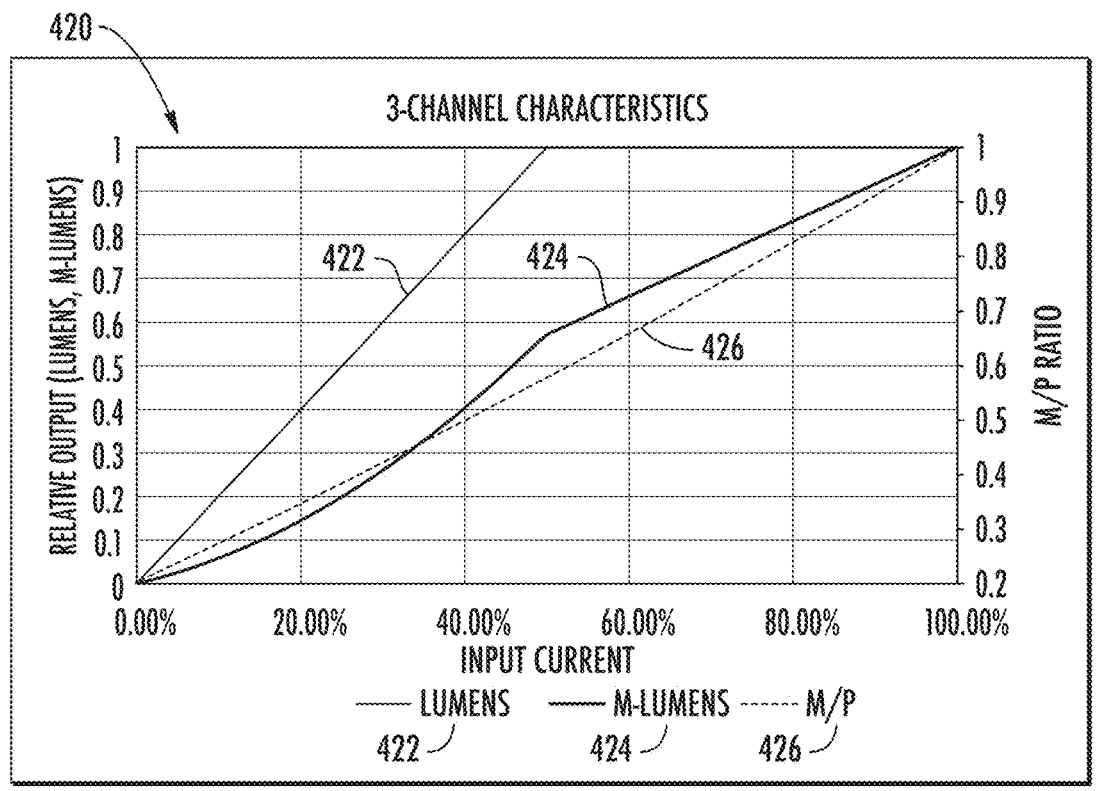
Figure 4D:
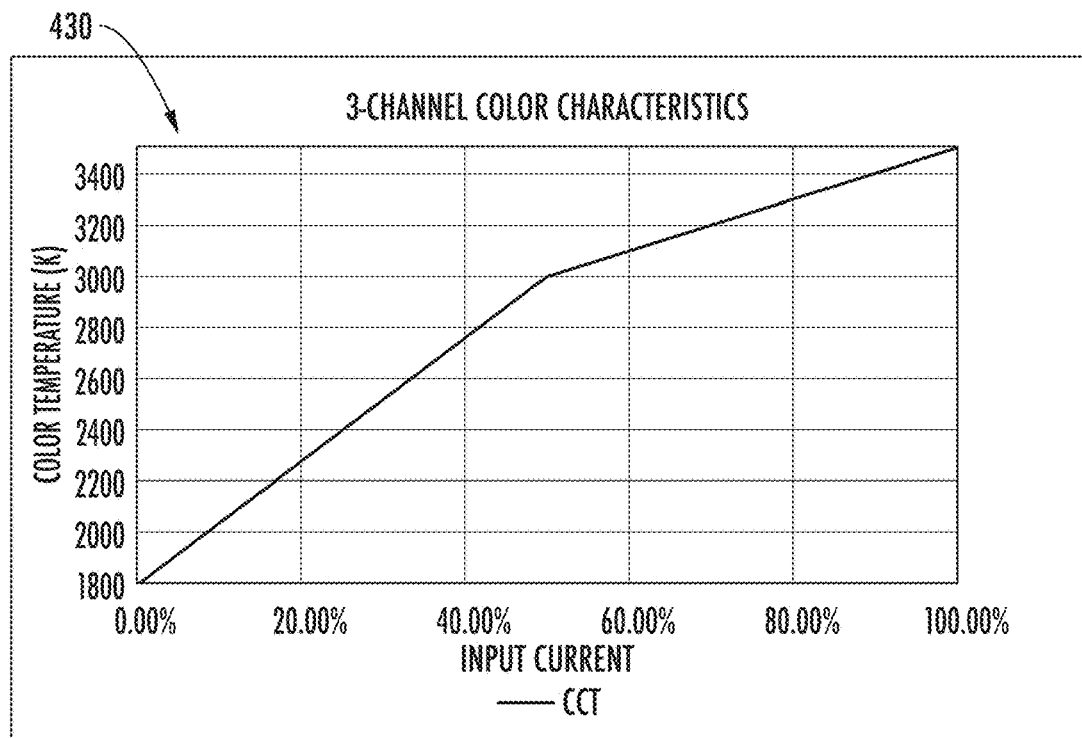

FIGS. 4A-4D show example dimming profiles, where FIGS. 4A-4B illustrate an embodiment of a 2-channel system (e.g., one LED channel for white light and a second LED channel for biological light) and FIGS. 4C-4D illustrate an embodiment of a 3-channel system (e.g., one LED channel for white light, a second LED channel for a melanopic component and a third channel for a far-red "twilight" component of biological light). FIGS. 4A and 4C show light output as a function of input current, while FIGS. 4B and 4D show color temperature as a function of input current.

Looking first at dimming profile 400 of FIG. 4A, the y-axis shows normalized lumens (relative output on a scale of 0 to 1) as well as M/P ratio. The x-axis shows the percentage of the maximum electrical current. In FIG. 4A, a plot of lumens (line 402), melanopic lumens (line 404, M-lumens), and M/P ratio (line 406, melanopic lux per photopic lux) over the course of the dimming profile is shown. In the dimming profile 400, melanopic lux per line 404 is reduced approximately linearly by the dimming interface, with a slight increase in slope when dimming below 50% current. However, visual stimulus (lumens per line 402) is reduced in a piecewise manner, with the lumens remaining constant on the upper portion (input current=50% to 100%) of the dimming interface and then decreasing linearly. Consequently, the M/P ratio per line 406 is also a piecewise function, having a linear response with a value of zero and a zero slope at lower intensities of brightness and a positive slope in the higher intensities. FIG. 4B illustrates the resulting color temperature graph 410, showing that the color temperature is reduced from 3500 K to 3000 K when the input current is reduced from 100% to 50% due to the decrease in M/P ratio.

The 3-channel dimming profile 420 of FIG. 4C shows a plot of lumens (line 422), melanopic lumens (line 424, M-lumens), and M/P ratio (line 426, melanopic lux per photopic lux). Similar to FIG. 4A, the visual stimulus (lumens per line 422) is reduced in a piecewise manner, with the lumens remaining constant on the upper portion of the dimming interface (input current=50% to 100%) and then decreasing linearly. The melanopic lux of line 424 has a similar slope as FIG. 4A when the current is greater than 50% but decreases more rapidly below 50% than in FIG. 4A. The resulting M/P ratio decreases at a slower rate than in FIG. 4A, but has a continuous decrease as the dimming current is reduced to 0% rather than in a piecewise manner as in FIG. 4A. FIG. 4D shows a color temperature graph 430 resulting from the dimming profile 420 showing that the color temperature has a much greater drop than in FIG. 4B, where the color temperature decreases from approximately 3500 K to 3000 K when the input current is dimmed from 100% to 50%, and then decreases to 1800 K at 0% current.

In other embodiments, dimming profiles other than linear may be used, such as logarithmic. In general, the reduction in M/P ratio (or OPN5/OPN4 ratio) within the dimming profiles may be implemented by changing the proportion of the total current to the various LED channels in the lighting fixture. For example, a proportion of the total current to an LED channel that generates biological light in the lighting fixture may be decreased at a higher rate (e.g., twice the rate) than a proportion of the total current to an LED channel that generates white light in the lighting fixture, when the total current is in a high percentage range of the setpoint (e.g., as the current is decreased from 100% to 50% of the maximum current). In general, reduction in melanopic light has less impact on light level in the high output range. Accordingly, in some embodiments the dimming profile uniquely utilizes this property by producing light in which the melanopic contribution can be reduced without a significant impact on the overall light (e.g., brightness and/or color temperature) in the high output range (e.g., over 50% of the maximum electrical current setpoint).

Figure 5:
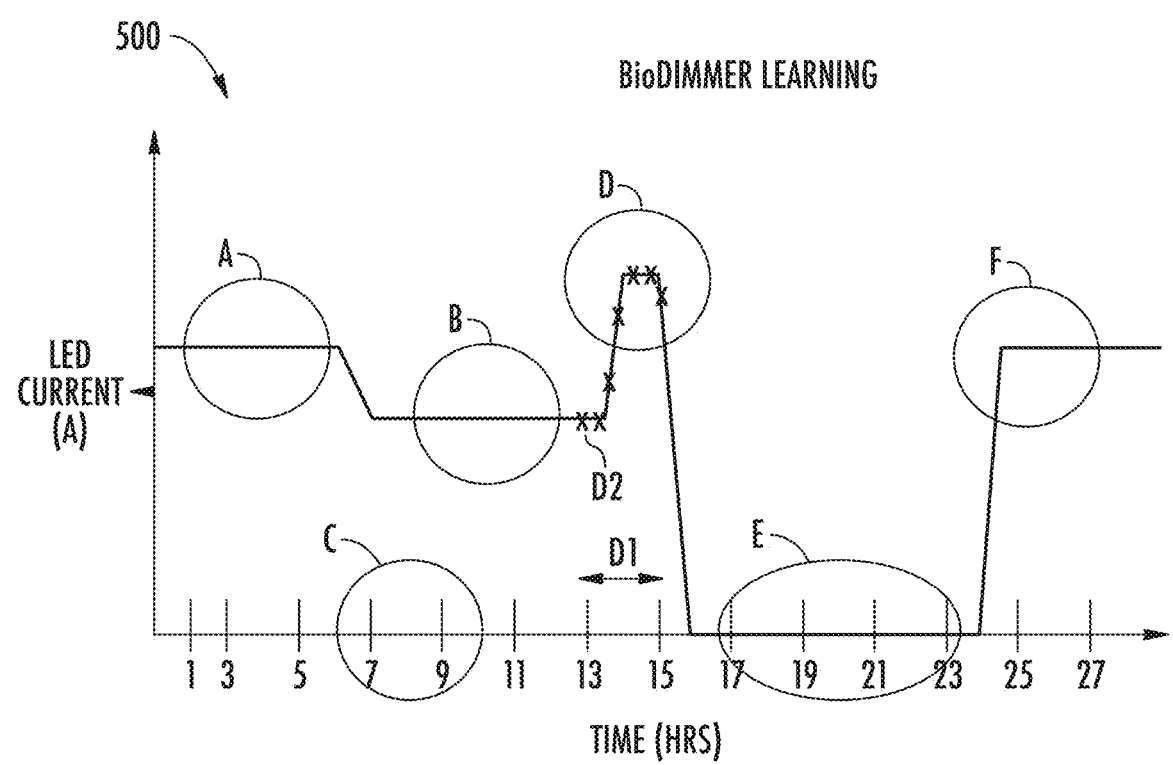
FIG. 5 is a graph illustrating operation of a machine learning algorithm, in accordance with some embodiments.

FIG. 5 is a graph 500 of LED current as a function of time, demonstrating aspects of a machine learning algorithm in accordance with some embodiments. The LED current of the y-axis represents the total current to all the LED modules in the lighting fixture, as adjusted by the user. The algorithm learns the user's light level preferences and monitors electrical currents to the LEDs continuously over time, delivering the proper biological light—where M/P ratio will be used in this example—based on the time of day or by the light level manually set by the user. Zone A of FIG. 5 represents the electrical current flowing through the LED panel at a particular time (starting at time=0 for illustration purposes), where the value may be determined by the initial start-up of the system, or an existing setpoint (the maximum current previously established by the system), or as adjusted by the user. If the current in zone A is at or above the setpoint (e.g., manually increased by the user), the maximum M/P ratio of the dimming profile is delivered. In the scenario of FIG. 5, the current in zone A shall be assumed to be the existing setpoint. In zone B, the M/P ratio is reduced because the user has adjusted the current to be lower than the setpoint. The M/P ratio is gradually changed to the new state, where the new state applies an M/P value according the dimming profile that correlates the M/P ratio with the percentage output (i.e. the percentage that the electrical current is of the setpoint). The change in M/P ratio follows the dimming profile and may take place, for example, over several minutes, such as 1, 2 or 5 minutes (note the illustrated slope between zones A and B is not necessarily to scale).

To determine when the setpoint should be changed in response to a user's behavior, the machine learning uniquely uses algorithms that react more quickly to higher setpoints (the user "dimming up" up the light level) than lower setpoints ("dimming down"). This approach for adaptively learning the setpoint prevents erratic changes in setpoints and is based on a use-model in which users are more likely to dim down the light level during normal usage than increasing the light level. Thus, increases that are input by the user through the dimming control are viewed as being more likely to be intentional changes than occurrences of dimming down. To monitor dimming levels, the microprocessor measures the LED current over time and regularly records an average current for sampling periods that are a relatively short duration (e.g. 10-20 minutes). Then at regular intervals—the intervals being longer than the sampling periods such as bi-hourly as represented by zone C—the system saves the smallest value of the recorded sampling period averages from the interval in a buffer. Saving the smallest (minimum) values that were averaged in each sampling period serves to filter out periodic short-duration increases (i.e., dimming up) so that they do not influence the normal setpoint. The device maintains a buffer of the bi-hourly minimums over a sliding window, such as over the last 24 to 28 hours, or over the last 26 hours.

Zone D demonstrates an example effect of saving the smallest averages from the intervals. In zone D, the user has adjusted the current to a higher level for a short time. In the 2-hour interval "D1" between hours 13 to 15, the averages for each sampling period (e.g., every 15-20 minutes) are represented by an "X." In accordance with some embodiments, the value at D2 will be saved as the smallest average value for the interval D1, and the peak values in zone D will be discarded. Note that the M/P ratio delivered during the temporary increase in zone D will be the maximum ratio available in the dimming profile. The maximum M/P ratio cannot be exceeded even when the current is increased beyond the setpoint (i.e., the level of zone A).

From the saved minimum averages, the largest value in a sliding window (e.g. 24- to 26-hour sliding window) is pulled from the buffer and compared to the existing setpoint. That is, each time a new average value (e.g. a bi-hourly minimum average) is saved, the system looks back at the sliding window. The buffer may be, for example, a first-in-first-out (FIFO) buffer such that the system looks retroactively at the most recent usage trends for broad scope maxima from the local minima that were saved. This approach of using long period monitoring of the high values serves to filter out routine dimming since dimming down is part of the expected use model. In other words, in some embodiments longer period dim-down durations are tolerated and take longer to force a downward adjustment on the setpoint. When the largest average is found to be different from the existing setpoint, the setpoint will be updated to the new value. For example, if the largest average in the sliding window is higher than the existing setpoint, then the setpoint will be increased to the new value. Conversely, if the largest average in the sliding window is lower than the existing setpoint, then the setpoint will be decreased to the new value.

Importantly, the system requires the new value to be maintained for a certain time period before establishing a new setpoint, which results in a stable system that is not erratic but still is responsive to changes by the user. For example, having some amount of wait time before increasing the setpoint prevents transient activities such as cleaning crew activities or maintenance work from falsely affecting the setpoint. In some embodiments, the waiting time interval required for establishing a lower setpoint is longer than for establishing a higher setpoint. In other words, the microprocessor may be configured to set the setpoint by decreasing the setpoint when the largest of the plurality of smallest average values over a first time interval is less than an existing setpoint, and increasing the setpoint when the largest of the plurality of smallest average values over a second time interval is greater than an existing setpoint, where the second time interval is less than the first time interval. In some embodiments, for example, the first time interval required for a decreasing the setpoint may be 4 to 26 hours, such as 6 hours or 12 hours or 24 hours, while the second time interval required for increasing the setpoint may be 1 to 4 hours, such as 2 hours. When a new setpoint is determined, the system may implement the new setpoint instantaneously or may implement the new setpoint gradually, such as 5-15% of the total change per second, such as 10% per second.

In zone E the system is off, such as when a user is asleep or a workplace is closed. During this time, the buffer data and setpoint are saved, such as in a non-volatile memory of the microprocessor, so that the machine learning can resume with the previous historical data when power is restarted. The measuring of electrical currents and recording of smallest averages are discontinued when the system is off. Consequently, when the system is turned on at zone F, the M/P ratio to the LEDs is delivered at the already-established setpoint.

Figure 6:
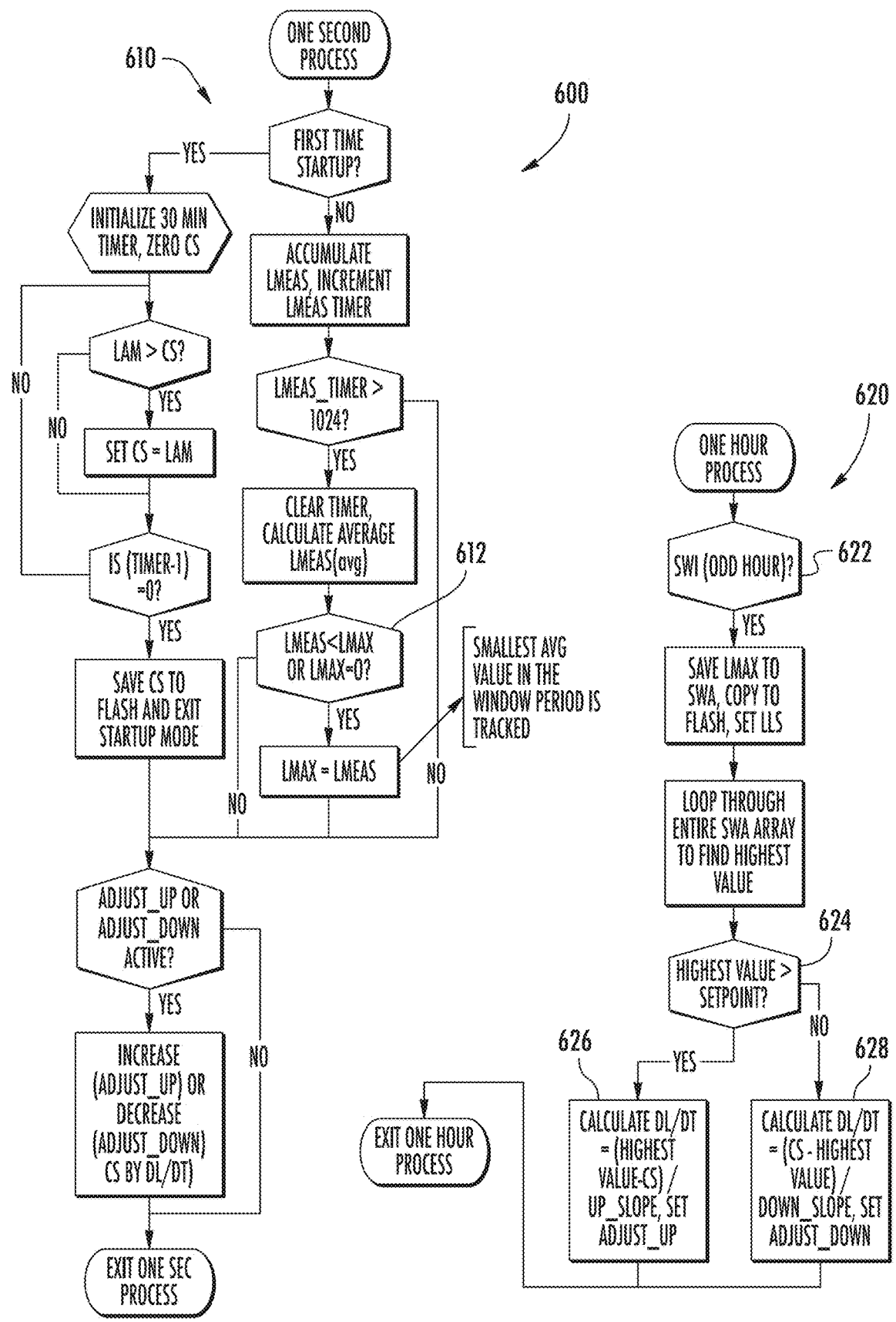
FIG. 6 is a flowchart of a machine learning algorithm, in accordance with some embodiments.

FIG. 6 is a flowchart 600 depicting details of the machine learning algorithm of the microprocessor, in accordance with some embodiments. Terminology used in the flowchart 600 is listed below, along with example values of one embodiment:

CS=Current setpoint (level having the maximum biological light contribution)
AM=Average current measurement (e.g., 32 samples at 16 kHz)
LAM=Long period average current measurement (e.g., 32 samples of AM)
LMEAS=Local (windowed) current (e.g., 1024 samples of LAM accumulated every second, represents average current over 1024 second period)
LMAX=Largest LMEAS value in sliding window interval
SWI=Sliding window interval. LMAX values are saved at this rate (e.g., may consist of odd hours, such as 1-25 hours, resulting in 13 data points)
SWA=Sliding window current array. This is the array of LMAX points that will be tested at the SWI to determine if a CS adjustment is required.
UP_SLOPE=Rate (time value, e.g., seconds) that the CS will be adjusted to new higher LAM setpoint (e.g., 180 seconds)
DOWN_SLOPE=Rate (time value, e.g., seconds) that the CS will be adjusted to new lower LAM setpoint (e.g., 180 seconds)
dI/dt=Incremental change to CS when a change is required, represented as a change in magnitude/adjustment slope.
LLS=Last LMAX saved. This flag indicates an LMAX is saved to SWA, which is used to force the next LMEAS to LMAX to establish the next high value in the array (otherwise LMAX would perpetuate).
ADJUST_UP=Process flag indicating CS is gradually being increased as a result of a learned adaptation.
ADJUST_DOWN=Process flag indicating CS is gradually being decreased as a result of a learned adaptation.

The flow starting at step 610 is a function that is called every second, involving auto-sampling of electrical current measurements at a frequency that is preferably greater than the frequency used for the electrical current drivers of the system. For example, in the embodiment of FIG. 6, samples may be taken at 16 kHz. In some embodiments, the total current measurement is made by taking a single measurement of the current to the overall LED panel of a lighting fixture. In other embodiments, the total current measurement is made by taking measurements of individual LED channels and adding them together to derive the total current that will be used in subsequent calculations. Average values ("LMEAS") are calculated from the measurements of the total current over a sampling period, such as a period of 10 to 20 minutes, such as 17 minutes (1024 seconds) in the embodiment shown. A plurality of smallest average values is calculated from the measurements of the total current over a plurality of sampling periods. In the embodiment shown, each smallest average of the total current in a sliding window period is calculated by comparing LMEAS to a largest value (LMAX) in the sliding window period at step 612 and updating LMAX if LMEAS is less than LMAX. The sliding window interval may be, for example two hours (bi-hourly).

The flow 620 of FIG. 6 is a process that is performed for the sliding window interval, such as bi-hourly (e.g., on odd number hours per step 622) in the embodiment shown. The flow 620 sets a setpoint ("CS") based on the highest value of LMAX of the plurality of smallest average values, where the setpoint defines a maximum current to be used by the dimming profile (and at which the maximum biological light will be delivered). If the highest value of LMAX is greater than the setpoint at step 624, the CS is adjusted upward in step 626. If the highest value of LMAX is less than the setpoint at step 624, the CS is adjusted downward in step 628. The microprocessor then controls the M/P ratio according to the dimming profile, where the dimming profile correlates the M/P ratio to a percentage of the maximum current. For example, for a lighting fixture that has a first LED channel that emits a first spectrum comprising white light and a second LED channel that emits a second spectrum comprising biologically tailored light (e.g., including 480-500 nm and 650-670 nm), the M/P ratio represents the relative amount of melanopic light being output. The microprocessor instructs the LED modules to output the maximum M/P ratio when the total current is equal to or greater than the setpoint.

In some embodiments, an open-loop neural network may be utilized to further refine the adaptation of lighting level setpoints. Various measurables that influence the adaptive response may be tracked, each of which are assigned a weight. The weights are combined with the measurables to calculated weighted factors. A computation of the weighted factors, such as by summing the weighted factors, may be used to affect the learning behavior of the system. Examples of measurables include, but are not limited to: elapsed time that the dimmer setting has been steady, elapsed time that the lighting fixture has been powered, total run time, setting (setpoint) at initial power-up, number of dimming adjustments that have been made since the power was turned on, number of dimming adjustments that have been made in the lighting fixture history, rates at which the user increases or decreases the dimming control, and magnitudes at which the user increases or decreases the dimming control. These measurables can be used to change, for example, how the wait-time intervals and the slopes at which new increased or decreased setpoints are implemented. For example, the measurables can be used to distinguish human-implemented or machine-implemented values of measured current. In another example, the measurables may be used to account for different fade rates capabilities of different lighting fixtures.

Figure 7:
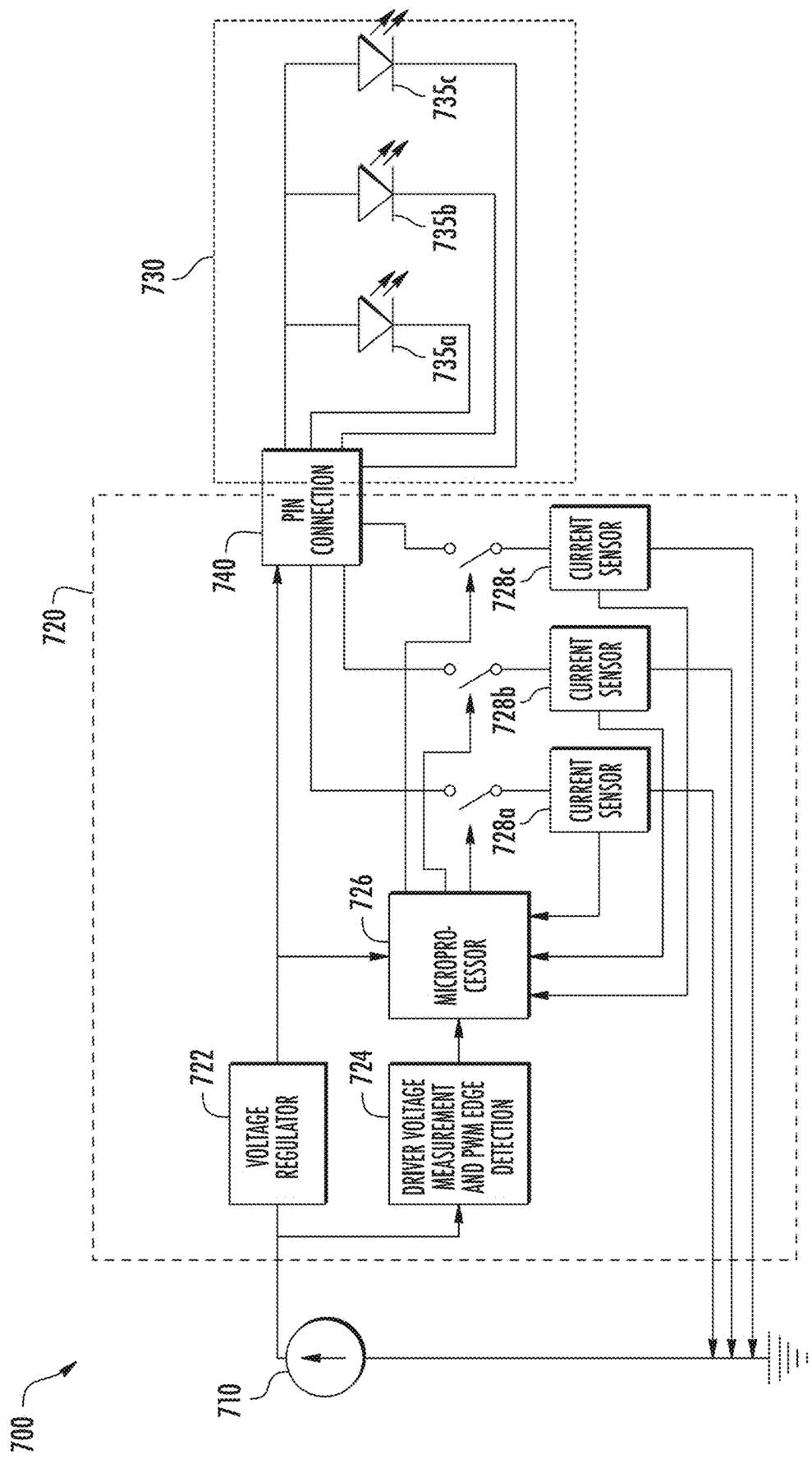
FIG. 7 is a schematic of a bio-dimming electrical circuit, in accordance with some embodiments.

FIG. 7 is an electrical circuit schematic of an embodiment of a dimming module circuit 700 that may be used in the lighting system 100 of FIG. 1. Circuit 700 includes a current driver 710, a bio-dimmer controller 720, and an LED engine 730. The bio-dimmer controller 720 measures the electrical current going through the LED engine 730 of the lighting fixture (e.g., lighting fixture 130 of FIG. 1). The measurements taken by circuit 700 enable the machine learning algorithm of microprocessor 726 (i.e., the microprocessor 120 of FIG. 1) to determine the maximum current provided to the LEDs, and consequently to determine a setpoint at which a maximum melanopic to photopic ratio is applied to the spectrum. The setpoint establishes the scale for the M/P dimming profile, where the setpoint is the maximum value of the scale.

LED engine 730 includes a first LED channel 735a, a second LED channel 735b and optionally a third LED channel 735c. First LED channel 735a may be, for example, a white light LED. Second and third LED channels 735b and 735c, respectively, may generate wavelengths corresponding to biological light such as OPN4 photoreceptor (melanopic), sub-dermal and/or OPN5 photoreceptor wavelengths which shall be described in more detail later in this disclosure. Bio-dimmer controller 720 includes a voltage regulator 722, circuitry 724 that performs driver voltage measurement and pulse-width modulation (PWM) edge detection, microprocessor 726, a first current sensor 728a, a second current sensor 728b and an optional third current sensor 728c. The current sensors 728a, 728b and 728c measure the currents of LED channels 735a, 735b and 735c, respectively, via connector 740 and provide the current measurements to microprocessor 726. In embodiments where the third LED channel 735c is present, the connector 740 may be a 4-pin connection. In embodiments where the third LED channel 735c is not present (i.e., the LED system is a 2-channel configuration), the connector 740 may be a 3-pin connection.

The hardware of circuit 700 incorporates real-time current measurement as the basis for the machine learning algorithm—adapting to the occupant's light level preferences by manipulating the balance of the biological (e.g., SKYBLUE) and white LED sources based on the electrical current and the electrical current history. Although in some embodiments the total current through all LED channels may be measured as a single quantity, in the embodiment illustrated in the circuit 700, the electrical current is measured in each LED channel separately. A benefit of measuring individual channels is identifying the current distribution (sharing) between the parallel white and biological light channels and compensating for them so that a predictable M/P ratio is provided. Current sharing is unbalanced when there is a difference in the forward voltage ($V_f$) characteristic of the channels. The forward voltage of an LED is variable, being subject to, for example, manufacturing variability, forward current ($I_f$), temperature, aging, and wavelength (band gap energy). LED current increases in a somewhat exponential fashion with increasing forward voltage, so small differences in the voltage characteristics of parallel LEDs creates substantial differences in current flow between them. In the present embodiments, a design that monitors current flow in the channels separately (e.g., $I_B$=SKYBLUE, $I_W$=white) as a function of the switched channel (SKYBLUE) duty cycle can calculate 'Normalized' $I_B$ as:

$$I_B(\text{Norm}) = \frac{I_B}{PWM \text{ Duty Cycle}}$$

And the current ratio between the channels as:

$$\text{Current Ratio} = \frac{I_B(\text{Norm})}{I_W + I_B}$$

The current ratio can be used to tune the duty cycle such that a predictable current distribution (and thus M/P lumens) can be delivered independent of voltage variations of the diodes. Note that the current measurements described above may also be used to adjust current ratios of OPN5- and OPN4-targeted biological light.

Various embodiments of the dimmer learning of FIGS. 5-7 are possible. In some embodiments, the lighting systems have a single dimmer control that enables a user to adjust a total current to the lighting fixture. A microprocessor is configured to take measurements of a first current through a first LED channel (e.g., emitting a first spectrum comprising white light) and a second current through a second LED channel (e.g., emitting a second spectrum biological lighting having wavelength peaks from 650 nm to 670 nm and from 480 nm to 500 nm), where a sum of the first current and the second current is the total current. The microprocessor is also configured to store a plurality of smallest average values of the total current, set a setpoint based on a largest of the plurality of smallest average values and control a melanopic to photopic ratio (M/P ratio) according to a dimming profile. Each of the smallest average values is calculated from the measurements of current over a plurality of sampling periods. The setpoint defines a maximum current for the dimming profile of the lighting fixture. The dimming profile correlates the M/P ratio to a percentage of the maximum current, where the M/P ratio is a ratio of a melanopic lux to a photopic lux. A maximum M/P ratio is output when the total current being used in the lighting fixture is equal to or greater than the setpoint.

In some embodiments, the M/P ratio is changed by adjusting a first proportion of the total current to the first LED channel and a second proportion of the total current to the second LED channel. In some embodiments, the microprocessor is configured to set the setpoint by decreasing the setpoint when the largest of the plurality of smallest average values over a first time interval is less than an existing setpoint and increasing the setpoint when the largest of the plurality of smallest average values over a second time interval is greater than an existing setpoint, where the second time interval is less than the first time interval. For example, the first time interval may be from 24 to 26 hours and the second interval from 1 to 4 hours. In some embodiments, a second proportion of the total current to the second LED channel is decreased at a higher rate than a first proportion of the total current to the first LED channel when the total current is between 50% to 100% of the setpoint. For example, the second proportion may be decreased at twice the rate as the first proportion. In some embodiments, the plurality of smallest average values and the setpoint are saved in a non-volatile memory.

In some embodiments, a lighting fixture includes a first LED channel that emits a first spectrum comprising white light, a second LED channel that emits a second spectrum comprising biologically tailored light having wavelength peaks from 650 nm to 670 nm and from 480 nm to 500 nm, and a third LED channel that emits a third spectrum having a wavelength peak from 370 nm to 410 nm. A single dimmer control enables a user to adjust a total current to the lighting fixture. A microprocessor of a lighting control system is configured to take measurements of current, set a setpoint based on a plurality of average values of the total current, and control an OPN5/OPN4 ratio (ratio of an OPN5 lux to a melanopic lux) according to a dimming profile. Current measurements are taken by measuring a first current through the first LED channel, a second current through the second LED channel and a third current through the third LED channel, where a sum of the first current and the second current and the third current is the total current. The setpoint defines a maximum current for a dimming profile of the lighting fixture. In some embodiments, the microprocessor is configured to store the plurality of average values, each of the average values being a smallest average value over a sampling period; and set the setpoint based on a largest of the plurality of average values over a time interval. In some embodiments, the microprocessor is configured to set the setpoint by decreasing the setpoint when the plurality of average values over a first time interval is lower than an existing setpoint, and increasing the setpoint when the plurality of average values of the total current over a second time interval is greater than the existing setpoint, where the second time interval is less than the first time interval. The dimming profile correlates the OPN5/OPN4 ratio to a percentage of the maximum current. A minimum OPN5/OPN4 ratio is output when the total current is equal to or greater than the setpoint.

Figure 12:
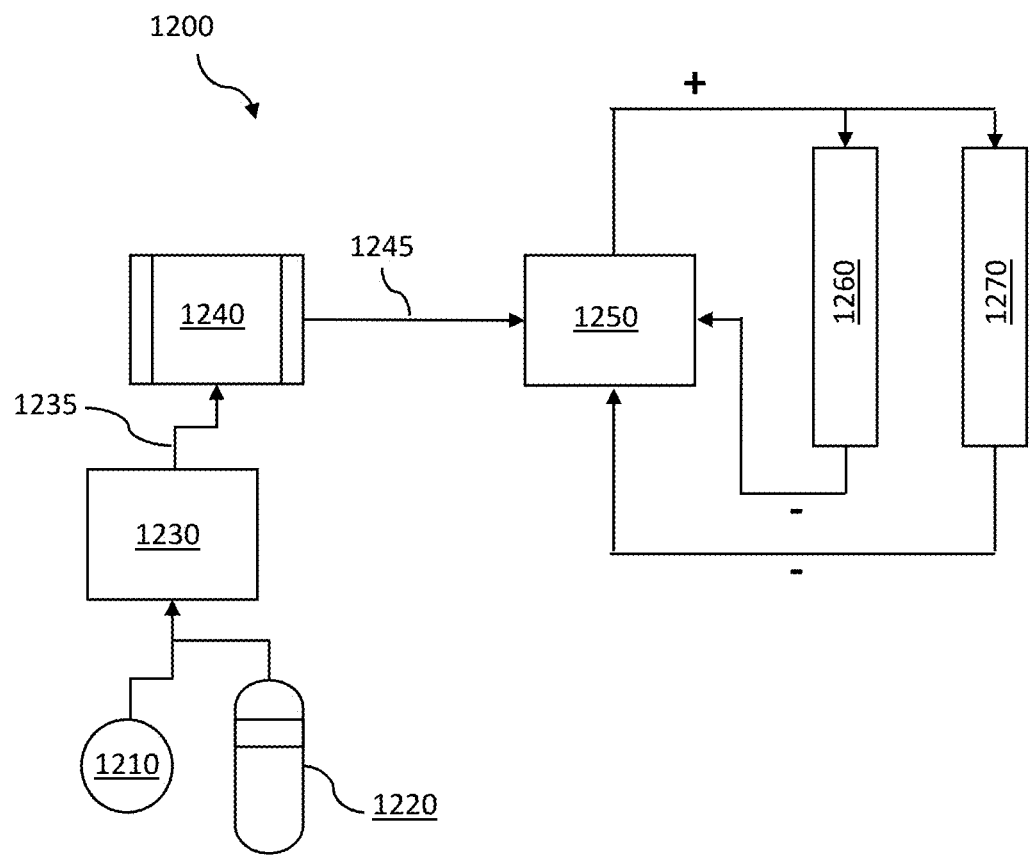
FIG. 12 is a schematic of a dual-mode lighting system, in accordance with some embodiments.
Figure 13:
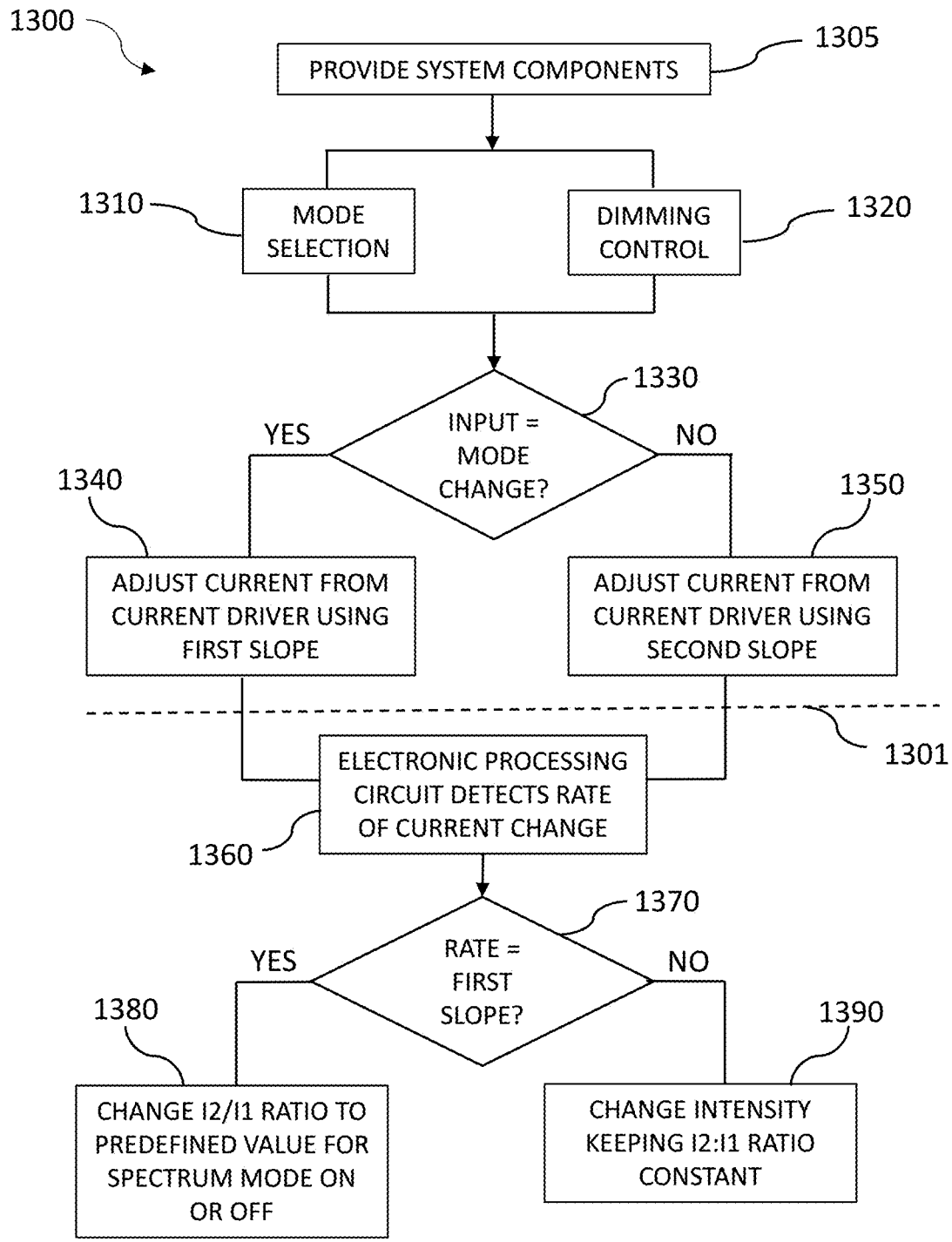
FIG. 13 is a flowchart of configuring and operating a dual-mode lighting system, in accordance with some embodiments.
Figure 14:
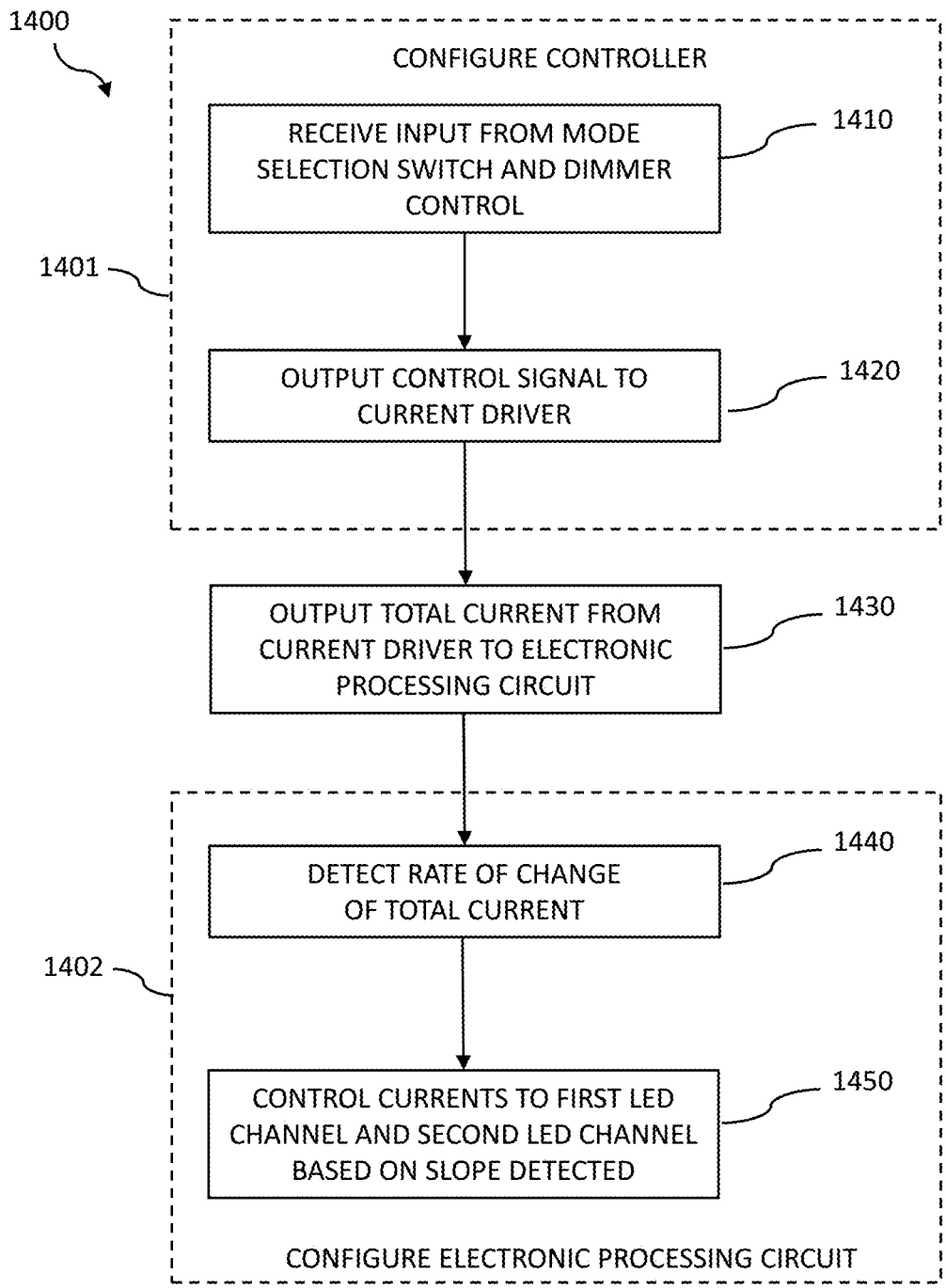
FIG. 14 is a flowchart of methods for controlling a lighting system, in accordance with some embodiments.

In other embodiments as shall be described in reference to FIGS. 12-14, lighting systems are disclosed that provide a dual-mode dimming system in which a user may choose between having a spectrum mode on or off. The spectrum mode may be used to implement a spectrum containing biologically tailored light as described throughout this disclosure, such as melanopic, sub-dermal stimulation, and/or plant-based wavelengths. Turning the spectrum mode off may implement a spectrum in which the biologically tailored light is altered to a different biological spectrum (e.g., day vs. night spectrums), or reduced in the amount of biological light in the spectrum, or removed compared to the spectrum mode. For example, the biologically tailored component(s) may be completely removed when the spectrum mode is turned off, such that only a white light spectrum is emitted. A dimmer control in the dual-mode dimming system allows a user to adjust an overall output of light (i.e., intensity, brightness, lumens) while keeping the ratio between LED channels constant. That is, as the user moves the dimmer control to increase (brighten) or decrease (dim) the overall light with the dimmer control, the proportion of biological component in the light does not change (regardless of whether the spectrum mode is on or off).

FIG. 12 is a schematic of a dual-mode lighting system 1200 that includes a mode selection switch 1210, a dimming control 1220, a controller 1230, a direct current (DC) current driver 1240, a microprocessor 1250, a first LED channel 1260 and a second LED channel 1270. Microprocessor 1250 may be substituted with a microcontroller or FPGA in other embodiments. Mode selection switch 1210 and dimming control 1220 provide input to controller 1230, where controller 1230 outputs a control signal 1235 to current driver 1240. Mode selection switch 1210 is a toggle switch such as a rocker switch or an on/off push button that allows a user to select the spectrum mode being on or off. Dimming control 1220 (similar to dimmer 110 in FIG. 1) is a variable level control such as a slider interface or rotating knob that allows a user to adjust an amount of light to different levels. The dimmer control 1220 may provide continuously adjustable positions or may have stepped increments. Microprocessor 1250 (which may be similar to microprocessor 726 in FIG. 7) is a multi-channel current controller that takes current supplied by current driver 1240 (similar to current driver 710 in FIG. 7) along wiring 1245 and divides the current between first LED channel 1260 and second LED channel 1270 (similar to LED channels 735a-c in FIG. 7). Two LED channels are shown in FIG. 12, but more LED channels may be included in other embodiments. Microprocessor 1250 may also store spectral dimming profiles, such as human and plant circadian bio-dimming profiles as described throughout this disclosure.

For the system 1200 to communicate to the microprocessor 1250 when the user has changed an on/off status of the spectrum mode, and thus whether to implement intensity changes (dimming) using the spectrum mode or not, unique techniques are utilized in accordance with some embodiments. Because current drivers typically only have wiring to output an electrical current supply, and do not have wiring to send additional information to a microprocessor, embodiments of the present disclosure provide a unique way for the microprocessor to distinguish between which mode to implement. The microprocessor 1250 takes the current output from the current driver 1240 and splits the current (i.e., total current) into the individual LED channels 1260 and 1270 of the lighting system. In some embodiments, the microprocessor delivers a desired amount of biological light (e.g., M/P ratio) by allocating proportions of the total current between biologically tailored (e.g., SKYBLUE) and white light LED channels. In some embodiments, the microprocessor 1250 can be configured such that having the spectrum mode on or off affects the proportion of current to supply to the individual LED channels for a particular overall intensity. This change in current distribution between LED channels can be utilized because certain wavelengths of biological light may be less efficient (have less photopic lumens per watt) than white light. When the amount of biological light is reduced or removed, less overall current to the LED engine may be needed since the white light channel may have a more efficient photopic output than the biological channel. For example, an LED channel that produces melanopic light (approximately 490 nm) may be approximately 30% less efficient in photopic lumens than white light. Consequently, when the light engine uses only white light, 30% less total current may be needed to produce the same brightness as when the melanopic component is added. When the melanopic component is used, more total current may be needed since some current will be used for the less efficient melanopic light. The same principles may be applied for biological wavelengths targeted at plant growth, such as far red and blue wavelengths.

Table 1 is an example comparison of controller output values (percentage of 0-10 V output) in an embodiment where biological light of the spectrum mode is approximately 30% less efficient than white light. Since the controller operates the current driver for the light engine, the controller outputs of Table 1 also indicate how the total current supplied to the microprocessor (or other electronic processing circuit) changes with dimmer position. For example, to achieve full intensity (dimmer control at 100%), 100% of a controller output (e.g., 10 V) may be required when the spectrum mode is on, while only 70% (e.g., 7 V) is needed with spectrum mode off. To achieve half of a full intensity (dimmer control at 50%), 50% of the controller output (e.g., 5 V) may be required when the spectrum mode is on, while only 35% (e.g., 3.5 V) is needed with spectrum mode off.

TABLE 1

Controller outputs to achieve dimmer intensities

| Dimmer Control Position | Controller Output: Spectrum Mode On | Controller Output: Spectrum Mode Off |
|---|---|---|
| 100% | 100% | 70% |
| 90% | 90% | 63% |
| 80% | 80% | 56% |
| 70% | 70% | 49% |
| 60% | 60% | 42% |
| 50% | 50% | 35% |
| 40% | 40% | 28% |
| 30% | 30% | 21% |
| 20% | 20% | 14% |
| 10% | 10% | 7% |

Referring again to FIG. 12, wiring 1245 represents a pair of wires—positive and negative—which is standard in existing hardware for current drivers. Since only two wires are available, which are designated for sending electrical current to microprocessor 1250 (and consequently to first LED channel 1260 and second LED channel 1270), there is no additional channel for the current driver 1240 to communicate the status of mode selection switch 1210 to the microprocessor 1250. Instead, system 1200 uniquely utilizes a rate of change of the electrical current (ΔI/Δt) transmitted over wires 1245 to indicate to the microprocessor 1250 whether to make a mode change or to make an intensity change. In other words, if either the mode selection switch 1210 or dimming control 1220 are changed by the user, a control signal (e.g., 0 V to 10 V) from controller 1230 to current driver 1240 is adjusted. The controller 1230 changes its control signal voltage to current driver 1240 at a first slope (percentage change per unit of time) if the spectrum mode has been turned on or off by a user via mode selection 1210. The controller 1230 changes its control signal voltage to current driver 1240 at a second slope if the intensity has been adjusted by a user via dimmer control 1220. The change in control signal 1235 causes the current driver 1240 to change the current to microprocessor 1250, via wiring 1245, at that particular slope. The first slope and the second slope are different from each other and are pre-established values in the controller 1230 and microprocessor 1250.

When the dimmer control 1220 is adjusted, whether the system has the spectrum mode on or off, a ratio of current between the second LED channel 1270 (e.g., for biological light) and the first LED channel 1260 (e.g., for white light) is kept constant while the total current is changed. That is, the proportion of electrical current split between the first and second LED channels remains the same while the overall current is reduced or increased. The dimming control 1220 determines the magnitude (i.e., amount) of change in current. For example, if the dimmer control 1220 is adjusted by the user from a first level to a second level, the controller 1230 is configured to change the total current from the current driver 1240 at the second slope, from the first level to the second level, while the ratio of the second current to the first current remains constant.

When spectrum mode is on, the ratio of the second current to the first current is set to a first predefined value. The ratio of the second current to the first current is set to a second predefined value when the spectrum mode is off. In some embodiments, the first predefined value involves the second current having a non-zero amount to emit biologically tailored light from the second LED channel. The first predefined value may be based on biological lighting spectrums as described throughout this disclosure. For example, the spectrum mode may utilize the spectral distribution 116 of FIG. 2, where the amount of melanopic light represented by point 117 is implemented when the spectrum mode is on, and the melanopic light is reduced to point 119 when the spectrum mode is off. In another example, the spectrum mode may utilize the spectral distributions of FIG. 8, where the 100% output curve 810 is implemented when the spectrum mode is on, and the 50% output curve (having lower melanopic and deep red wavelengths) is implemented when the spectrum mode is off.

FIG. 13 is a flowchart 1300 describing methods of configuring and operating the system 1200, in accordance with some embodiments. In step 1305, system components including mode selection switch 1210, dimmer control 1220, controller 1230, current driver 1240 and microprocessor 1250 are provided. Microprocessor 1250 may also be a microcontroller or FPGA in other embodiments. In step 1310, a user can choose between turning spectrum mode on or off by toggling the mode selection switch 1210. In step 1320, the user can adjust light levels using dimming control 1220. The controller 1230 reads the user inputs from both selection switch 1210 and dimming control 1220. If either the mode selection switch 1210 or dimming control 1220 are changed by the user, a control signal (e.g., 0 V to 10 V) from controller 1230 to current driver 1240 is adjusted.

Steps 1330, 1340 and 1350 are performed by controller 1230, while steps below line 1301 are performed by microprocessor 1250. When the controller 1230 in step 1330 receives input from the mode selection switch 1210 that the spectrum mode has been changed (either being turned on or off), then in step 1340 the controller instructs the current driver 1240 to change current at a rate approximately equal to a first slope (e.g., within a predetermined acceptable range, such as ±3% or ±5%). In a first scenario, the spectrum mode is already on, and the user presses mode selection switch 1210 to turn the spectrum mode off. The controller 1230 changes its control signal to reduce the total current by a compensation amount, the compensation amount being based on a difference in efficiency between biologically tailored light and white light. As an example of this first scenario, the controller may reduce its control signal voltage by 30% to compensate for less current (or no current) being needed by the second LED channel 1270 (which outputs biologically tailored light in this example) when spectrum mode is off. In "spectrum off" mode, a larger proportion of the spectral output is provided by first LED channel 1260 which emits white light. The control signal may be reduced from, for example, 7 V to 4.9 V (30% reduction from 7 V) at a first slope of −6% per second (e.g., to achieve 30% reduction in current over 5 seconds). In a second, opposite scenario, the user turns the spectrum mode from off to on in step 1310. The controller receives input from the mode selection switch in step 1330 and responds in step 1340 by increasing its control signal voltage to the current driver from 4.9 V to 7 V at the first slope rate of +6% per second. The change in control voltage consequently causes the current from the current driver to be adjusted at the same (first) slope.

If the controller 1230 detects in step 1330 that the intensity has been adjusted via dimmer control 1220, then in step 1350 the controller 1230 instructs the current driver 1240 to change current at a rate approximately equal to a second slope (e.g., within a predetermined acceptable range, such as ±3% or ±5%), to a level determined by dimming control 1220 (e.g., from a first level to a second level). In an example scenario, in step 1320 a user adjusts an overall amount of light desired using the dimmer control 1220, from 80% of its full slider position to 60% in this example. In step 1330 the controller 1230 recognizes that this is an intensity change and not a mode selection change since the input is from the dimmer control. Controller 1230 in step 1350 changes its control signal voltage to the current driver by an amount corresponding to how much the dimmer control was adjusted, adjusting the voltage at a second slope rate that is different from the first slope. Using Table 1 as a guide for this scenario, if the spectrum mode is on, then the control signal voltage is reduced from 80% to 60%. If the spectrum mode is off, then the control signal voltage is reduced from 56% to 42%. In either case (spectrum mode on or off), the control signal voltage is changed at a second slope rate of, for example, 5% per millisecond. The adjustment in voltage causes the current from the current driver to the microprocessor to be adjusted by the same amount (80% to 60%), and at the second slope.

The controller is programmed to utilize a second slope for an intensity change, that is different from the first slope for a mode selection change. The second slope that corresponds to an intensity change may be associated with a faster fade rate (e.g., 5% per 100 ms) than the first slope for a spectrum mode change (e.g., 6% per second). The slopes may be implemented in a stepped or a continuous manner. The controller is also configured to buffer a user adjustment rate from the dimmer control, so that the rate at which the control signal from the controller to the current driver changes is independent of the user adjustment rate. In other words, the controller does not necessarily send its control signal to the current driver as the user adjusts the dimmer controller, but rather sends it at the specified second slope rate. If the controller instead fed the dimmer signals directly into the current driver, then if the user happened to move the dimmer control at approximately the same rate as the first slope (that the controller uses to indicate a spectrum mode selection), then the lighting system would mistakenly implement a spectrum mode change rather than the desired intensity change.

In both steps 1340 and 1350, the current driver 1240 receives the control signal from the controller 1230 and outputs a total current to the microprocessor 1250, where the current driver 1240 changes the total current at a rate according to the first slope or the second slope based on the control signal.

In step 1360, the microprocessor 1250 detects the rate at which the total current from the current driver is being changed. Microprocessor 1250 continuously (i.e., at a certain frequency) monitors the current to determine when a change to the current has been made. In some embodiments, the microprocessor 1250 utilizes a particular sampling rate for measuring the electrical current (e.g., 6-10 kHz) and includes an active bandpass filter (e.g., lowpass filter) to ensure that the proper frequencies are being represented by the sampling rate. One or both of these (microprocessor sampling with or without the lowpass filter) may be used to determine the rate of electrical current change, where $\Delta I$ is a total change in current from current driver 1240 to microprocessor 1250 over a time interval $\Delta t$ (amount of time over which the current was measured). The total change in current $\Delta I$ may be measured as an absolute value or as a percentage of a maximum current. The rate of current change detected by the microprocessor 1250 is defined as $\Delta I/\Delta t$. In step 1370, if the microprocessor detects that the rate is equal to the first slope value (e.g., 6% per sec), then this indicates that a change in mode selection has been made (spectrum mode being turned on or off). If the microprocessor detects that the rate is equal to the second slope value (e.g., 5% per 100 ms), then this indicates to the microprocessor that an intensity of the overall light has been adjusted. The detecting in step 1370 may involve comparing the detected slope to a previously stored sample to decide whether a change in the mode selection or intensity has been made, and consequently whether the current ratio between the LED channels needs to be altered.

In some embodiments, the amount of current change $\Delta I$ may be used as an additional indicator to determine whether the mode selection has been changed. For instance, in the scenario described in relation to Table 1, the difference in required current (compensation amount) between the spectrum mode being on or off is 30% to achieve the same intensity. If the microprocessor detects $\Delta I$ as being approximately equal to the known compensation amount (30% in this case), this may be used as a secondary indicator for the system to recognize that a mode change has been made rather than an intensity change. In such an embodiment, the microprocessor is configured to detect an amount of change of the total current $\Delta I$; compare the amount of change to a compensation amount; and change the ratio between a first predefined value and a second predefined value (i.e., change the ratio from the first predefined value to the second predefined value, or from the second predefined value to the first predefined value) if the amount of change is equal to the compensation amount, indicating that the spectrum mode has been changed.

In a first scenario of step 1370, the microprocessor 1250 detects (in step 1360) that the current from current driver 1240 is changing at a rate approximately equal to the first slope. The previously stored sample was not equal to the first slope, and thus the newly measured rate indicates that the mode selection has been toggled. The microprocessor then replaces the previously stored sample with the newly detected slope or a flag representing the first slope. Because a mode selection change was detected, the microprocessor 1250 manages the current ratio I2/I1 between the second LED channel 1270 and the first LED channel 1260 accordingly in step 1380. The slope direction can indicate whether the spectrum was changed from being turned off to on or from being turned on to off. For instance, the spectrum mode may utilize a higher ratio of second current to the second LED channel having biological light. The controller in step 1380 increases a total current output by the current driver when the spectrum mode is turned on to compensate for biological light of the second LED channel being not as efficient as white light produced by the first LED channel. In this scenario of turning the spectrum mode on, the slope direction is positive, and the current ratio is changed from a second predefined value (spectrum mode off) to a first predefined value (spectrum mode on) that shifts more of the total current to the second LED channel. The spectrum mode is transitioned from off to on at a rate according to the first slope. If the first slope rate detected by the microprocessor is negative (decreasing), indicating the spectrum mode being turned from on to off, the current ratio is changed from the first predefined value to the second predefined value, also at the first slope rate.

In a second scenario of step 1370, the microprocessor 1250 detects (in step 1360) that the current from current driver 1240 is changing at a rate approximately equal to the second slope. The second slope rate indicates that the user has adjusted the overall intensity. The microprocessor compares the slope to a previously stored sample, which was equal to (or representative of) the second slope in this scenario. Thus, no change in current ratio between the LED channels is needed. In step 1390 the total current to the light engine is changed by a magnitude that was implemented by dimmer control 1220, while keeping the current ratio the same as whatever was already being used. For instance, if the spectrum mode was already on, the current ratio is maintained at the first predefined value while the overall current is changed (to change the overall intensity) at a rate of the second slope. If the spectrum mode was off, the current ratio is maintained at the second predefined value while the overall current is changed at a rate of the second slope.

In steps 1380 and 1390 the microprocessor 1250 controls a first current to the first LED channel 1260 and a second current to the second LED channel 1270, the first current and the second current each being a portion of the total current. In embodiments where only two LED channels are present, the first current plus the second current equals the total current. In embodiments where more than two LED channels are present, the current ratio may be a ratio between all the channels. For example, for a first LED channel having a first current I1 for white light, and second and third channels having currents I2 and I3 for biological light, the current ratio for the three-channel light engine may be (I2+I3)/I1.

In a first aspect of embodiments of FIGS. 12-13, an electronic processing circuit (e.g., a microprocessor, microcontroller or a field programmable gate array) for a lighting control system is configured to detect a rate at which a total current from a current driver is being changed, where the total current is an amount of current for a plurality of light emitting diode (LED) channels. The plurality of LED channels includes a first LED channel and a second LED channel. The electronic processing circuit is also configured to control a first current to the first LED channel and a second current to the second LED channel, the first current and the second current each being a portion of the total current. The controlling comprises: i) when the rate is detected as being a first slope, changing a ratio of the second current to the first current; and ii) when the rate is detected as being a second slope different from the first slope, keeping the ratio constant while the total current is adjusted according to a dimmer control. The first slope and the second slope are pre-established values programmed into the electronic processing circuit.

In embodiments of the first aspect, the electronic processing circuit may be further configured to change the ratio between a first predefined value and a second predefined value (i.e., change the ratio from the first predefined value to the second predefined value, or from the second predefined value to the first predefined value) when the rate is detected as being the first slope, the first slope indicating that a spectrum mode has been changed. In embodiments, the electronic processing circuit is further configured to: set the ratio of the second current to the first current to a predefined value that includes biologically tailored light emitted from the second LED channel when a spectrum mode is on; and reduce the biologically tailored light from the predefined value when the spectrum mode is off. In embodiments, the electronic processing circuit is further configured to, when the spectrum mode is turned from on to off: a) decrease the ratio of the second current to the first current; and b) reduce the total current at the first slope by a compensation amount, the compensation amount being based on a difference in efficiency between the biologically tailored light emitted from the second LED channel and white light emitted from the first LED channel. In embodiments, the electronic processing circuit is further configured to: detect an amount of change of the total current; compare the amount of change to a compensation amount; and change the ratio between a first predefined value and a second predefined value if the amount of change is equal to the compensation amount, indicating that a spectrum mode has been changed.

In a second aspect of embodiments of FIGS. 12-13, a method for a lighting control system includes providing an electronic processing circuit and configuring the electronic processing circuit. The electronic processing circuit is configured to detect a rate at which a total current from a current driver is being changed, where the total current is an amount of current for a plurality of light emitting diode (LED) channels. The plurality of LED channels includes a first LED channel and a second LED channel. The electronic processing circuit is also configured to control a first current to the first LED channel and a second current to the second LED channel, the first current and the second current each being a portion of the total current. The controlling comprises: i) when the rate is detected as being a first slope, changing a ratio of the second current to the first current; and ii) when the rate is detected as being a second slope different from the first slope, keeping the ratio constant while the total current is adjusted according to a dimmer control. The first slope and the second slope are pre-established values.

In embodiments of the first aspect, methods further include configuring the electronic processing circuit to change the ratio between a first predefined value and a second predefined value (i.e., change the ratio from the first predefined value to the second predefined value, or from the second predefined value to the first predefined value) when the rate is detected as being the first slope, the first slope indicating that a spectrum mode has been changed. In embodiments, methods further include configuring the electronic processing circuit to: set the ratio of the second current to the first current to a predefined value that includes biologically tailored light emitted from the second LED channel when a spectrum mode is on; and reduce the biologically tailored light from the predefined value when the spectrum mode is off. In embodiments, methods further include configuring the electronic processing circuit to, when the spectrum mode is turned from on to off: a) decrease the ratio of the second current to the first current; and b) reduce the total current at the first slope by a compensation amount, the compensation amount being based on a difference in efficiency between the biologically tailored light emitted from the second LED channel and white light emitted from the first LED channel. In embodiments, methods further include configuring the electronic processing circuit to: detect an amount of change of the total current; compare the amount of change to a compensation amount; and change the ratio between a first predefined value and a second predefined value if the amount of change is equal to the compensation amount, indicating that a spectrum mode has been changed.

In a third aspect of embodiments of FIGS. 12-13, a lighting control system includes a mode selection switch, a dimmer control, a controller and an electronic processing circuit (e.g., a microprocessor, microcontroller or field programmable gate array). The mode selection switch allows a user to turn a spectrum mode on and off. The dimmer control allows the user to adjust an overall amount of light output from a light engine, the light engine comprising a first LED channel and a second LED channel. The controller is connected to the mode selection switch and to the dimmer control. The controller outputs a control signal to a current driver, the control signal having a first slope when the mode selection switch is changed between on and off and having a second slope when the dimmer control is adjusted. The first slope is different from the second slope. The current driver receives the control signal from the controller and outputs a total current to the electronic processing circuit, where the current driver changes the total current at a rate according to the first slope or the second slope based on the control signal. The electronic processing circuit detects the rate at which the total current from the current driver is being changed; and controls a first current to the first LED channel and a second current to the second LED channel. The first current and the second current are each a portion of the total current. The controlling comprises: i) when the rate is detected as being the first slope, changing a ratio of the second current to the first current, and ii) when the rate is detected as being the second slope, keeping the ratio constant while the total current is adjusted according to the dimmer control.

In embodiments of the third aspect, the electronic processing circuit is configured to change the ratio between a first predefined value and a second predefined value (i.e., change the ratio from the first predefined value to the second predefined value, or from the second predefined value to the first predefined value) when the rate is detected as being the first slope, the first slope indicating that the spectrum mode has been changed. In embodiments, the electronic processing circuit is configured to: set the ratio of the second current to the first current to a predefined value that includes the biologically tailored light when the spectrum mode is on; and reduce the biologically tailored light from the predefined value when the spectrum mode is off. In embodiments, when the spectrum mode is turned from on to off, the electronic processing circuit is configured to: a) decrease the ratio of the second current to the first current; and b) reduce the total current at the first slope by a compensation amount, the compensation amount being based on a difference in efficiency between the biologically tailored light and the white light. In embodiments, the controller is configured to buffer a user adjustment rate of the dimmer control, wherein the first slope or the second slope of the control signal from the controller to the current driver is independent of the user adjustment rate. In embodiments, when the dimmer control is adjusted by the user from a first level to a second level, the controller is configured to change the total current from the current driver at the second slope, from the first level to the second level, while the ratio of the second current to the first current remains constant.

In various embodiments of the present disclosure, the first LED channel emits a first spectrum comprising white light; and the second LED channel emits a second spectrum comprising biologically tailored light. The second LED channel may emit a second spectrum comprising biologically tailored light having a first wavelength peak in a range from 650 nm to 670 nm and a second wavelength peak in a range from 480 nm to 500 nm. The second LED channel may emit a second spectrum comprising biologically tailored light having a wavelength peak in a range from 700 nm to 800 nm. The second LED channel emits a second spectrum comprising biologically tailored light having a wavelength peak in a range from 400 nm to 500 nm. The second LED channel may emit a second spectrum comprising biologically tailored light having a first wavelength peak in a range from 700 nm to 800 nm and a second wavelength peak in a range from 400 nm to 500 nm.

FIG. 14 is a flowchart 1400 representing methods for a lighting control system, in accordance with some embodiments and using the techniques described in relation to FIGS. 12-13. Block 1401 includes steps for configuring a controller, and block 1402 includes steps for configuring an electronic processing circuit (e.g., a microprocessor, microcontroller or FPGA). Step 1410 involves configuring a controller to receive input from a mode selection switch and also from a dimmer control. The mode selection switch allows a user to turn a spectrum mode on or off. The dimmer control allows a user to adjust an overall amount of light output from a light engine, the light engine comprising a first LED channel and a second LED channel. Step 1420 involves configuring the controller to output a control signal to a current driver, where the control signal has a first slope when the mode selection switch is changed between on and off and has a second slope when the dimmer control is adjusted. The first slope is different from the second slope. In step 1430, the current driver receives the control signal from the controller and outputs a total current to the electronic processing circuit. The current driver changes the total current at a rate according to the first slope or the second slope based on the control signal from the controller. In step 1440, the electronic processing circuit is configured to detect the rate at which the total current is being changed by the current driver. In step 1450, the electronic processing circuit is configured to control a first current to a first LED channel and a second current to a second LED channel based on the detected rate and the amount that the total current is changed. The first current and the second current are each a portion of the total current. The electronic processing circuit is configured to control the currents to the LED channels by implementing i) when the rate is detected as being the first slope, changing a ratio of the second current to the first current, and ii) when the rate is detected as being the second slope, keeping the ratio constant while the total current is adjusted according to the dimmer control. The first slope and the second slope are pre-established values programmed into the electronic processing circuit.

Biological Light

The lighting systems of the present embodiments may use various biological spectral distributions depending on the application such as an office space or home environment, or daytime-only use versus day and night use. In some embodiments, spatial considerations are also incorporated into the dimming profiles, in which color separation of different spectra can be implemented for fixtures with uplighting and/or downlighting.

The lighting systems of the present embodiments utilize biological light that includes multiple wavelengths having biological significance. The suprachiasmatic nuclei in the hypothalamus regulate circadian rhythms using input from ganglion cells in the retina. The ganglion cells contain proteins called opsins, where melanopsin (OPN4) responds to the wavelength of 490 nm. Illumination profiles of the present embodiments include this melanopsin spectral component relevant to optical input.

Furthermore, in a recent study by Ota, et al., "Impaired Circadian Photoentrainment in OPN4-Null Mice," iScience, p. 299-305, Aug. 31, 2018, it was found that OPN5, which has peak absorption at 380 nm, also plays a role in photoentrainment. In some embodiments, the lighting spectra may also uniquely include a peak wavelength at around 380 nm. Because some plastics—such as polycarbonate and poly(methyl methacrylate) that are commonly used for light fixtures—attenuate light below 400 nm, some embodiments that target OPN5 may utilize wavelengths up to 410 nm. For example, the embodiments of biological spectra include wavelength peaks from 480 nm to 500 nm and/or from 370 nm to 410 nm, where these peaks are present when the lighting output is at its maximum level of the dimming profile. That is, the biologically significant wavelengths are present at the maximum current of the dimming profile. The biologically significant wavelengths may decrease or increase as the current is reduced, according to the specific dimming profile.

In the eye, the interaction between rods, cones and melanopsin is nuanced. Under bright light (daytime) conditions, melanopsin plays a large role in circadian regulation, receiving some minor inputs from cones. Thus, melanopic lux is the proper metric for daytime use. Under low light (nighttime) conditions, melanopsin impact is limited and cones become a large contributor to circadian regulation, with contributions from rods. Thus, it is believed that photopic lux is the proper metric for nighttime use. Additionally, spatial distribution of light plays a significant role in the impact of light on the eye's photoreceptors. That is, light coming from above the horizon (and being received in a downward direction by the eye) has a much stronger impact on melanopsin-related photoreceptors than light coming from below the horizon (being received in an upward direction). In some embodiments, the lighting systems of the present disclosure beneficially target and optimize biological effects using lighting via spatial distribution and/or spatial modulation of illumination systems (which may also be referred to as color separation in this disclosure), such as by creating layers of light that illuminate different surfaces at different times of day (e.g., high vertical illumination during biological daytime, and low vertical illumination during biological night time).

Figure 8:
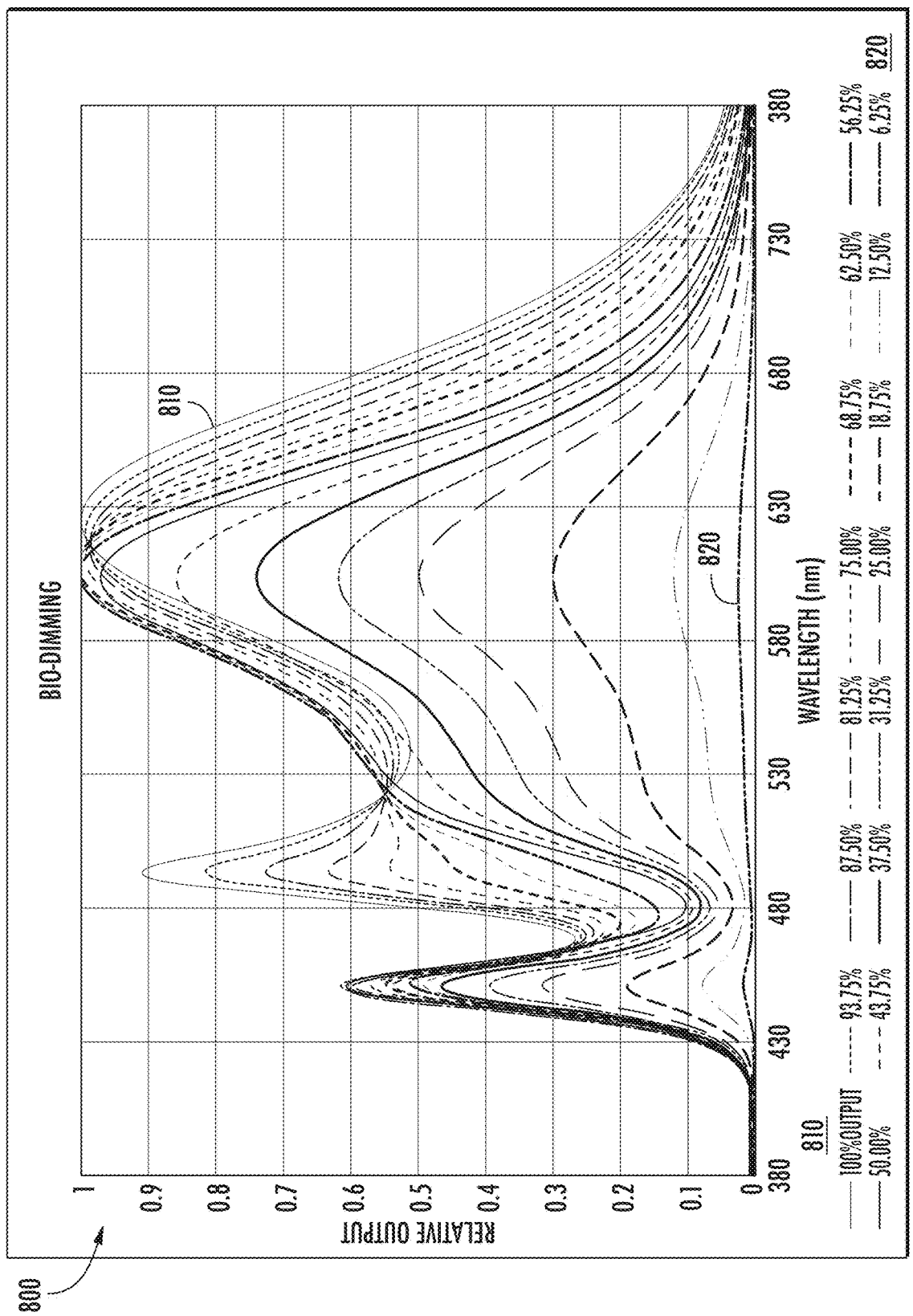
FIG. 8 shows a graph of a biological lighting spectrum and dimming profile, in accordance with some embodiments.

Illumination profiles also include enhanced spectral components that are relevant to the skin's optical window and sub-dermal cellular stimulation (e.g., deep-red and/or infrared). When considering color separation, embodiments of the present disclosure uniquely recognize that visual stimulus is not the only area of importance. Far-red wavelengths have deeper skin penetration allowing for secondary pathways to enhance the circadian signal. One mechanism that drives this response is via the mitochondria, which contain a chromophore cytochrome C oxidase. Upon radiation of cytochrome C oxidase, ATP density increases providing intercellular signaling and increased daytime alertness levels. Additionally, these far-red wavelengths provide an increase in core body temperature, which further aids in circadian entrainment. In some embodiments, maximum intensity spectra include additional far-red wavelengths designed to aid in providing extra daytime signals. The far-red wavelengths may be in the range from 630 nm to 1100 nm, such as 700 nm to 800 nm, such as having a peak around 660 nm or 720 nm, Some embodiments uniquely utilize lighting spectra that include both 490 nm for optical stimulation and 660 nm for sub-dermal cellular stimulation. For example, some embodiments include wavelength peaks from 650 nm to 670 nm and/or from 480 nm to 500 nm and/or from 370 nm to 410 nm, where these peaks are present when the lighting output is at its maximum level of the dimming profile. Some embodiments include wavelength peaks greater than about 700 nm and/or wavelength peaks from 480 nm to 500 nm and/or from 370 nm to 410 nm, where these peaks are present when the lighting output is at its maximum level of the dimming profile FIG. 8 is an embodiment of a graph 800 showing a first biological lighting spectrum, which shall be referred to as a "bio-dimming" spectrum in this disclosure. The graph 800 represents a dimming profile in which the output levels of the spectrum changes as the input current is decreased, such as being adjusted manually by a user or automatically by the lighting control system. Designed for offices or daytime-only spaces, this dimming profile allows the opportunity to remove melanopic (490 nm) biological potency in late night hours by reducing a high biological output to a low biological output. The graph 800 shows relative output on the y-axis (i.e., output normalized to a scale of 0 to 1) as a function of wavelength for varying percentages of output. For example, 100% output curve 810 represents when the amount of current is being delivered at or above the setpoint, where the setpoint is determined by the machine learning algorithm. The subsequent curves represent spectral distributions that will be delivered when the current is at decreasing percentages of the setpoint. At full output curve 810 (the maximum current of the dimming profile), the significant wavelength peaks represent white light combined with melanopic light in the 480 nm to 500 nm range (e.g., 490 nm) and sub-dermal stimulation light in the 650 nm to 670 nm range (e.g., 660 nm), where the 660 nm peak appears as a broad peak in the range from 600 nm to 660 nm due to the combination with white light. The peak near 460 nm is also due to the white light. The full output curve 810 also includes higher amounts of far-red wavelengths (e.g., 660 nm and above or 720 nm and above) than conventional white light spectra, to provide additional circadian entrainment through skin penetration.

As the spectrum of graph 800 is dimmed from full output curve 810 to low output curve 820 (illustrated as 6.25% of the maximum current in this embodiment), the biological light in the 480-500 nm range is gradually removed (e.g., linearly as a function of percentage of the maximum current in some embodiments). The sub-dermal (deep red) components are also removed as the dimming profile is decreased. In one embodiment the bio-dimming spectrum of graph 800 can be implemented by a 2-channel LED design in which one LED chip (i.e., LED channel) generates white light and the other LED chip generates the biological light (melanopic and sub-dermal). For example, the white light may have a correlated color temperature (CCT) of 2700 K to 4000 K (e.g., approximately 3000 K or 3500 K), and the biological light may be generated by the SKYBLUE supplement LED as described earlier. As the total current to the lighting fixture is dimmed, the proportion of light between the two chips is adjusted to achieve the various M/P ratios shown by the curves in FIG. 8. Other embodiments of LED channels for implementing the bio-dimming spectrum are possible, such as the 3-channel LED embodiment described in relation to FIGS. 4C-4D.

The correlation between M/P ratio and percentage reduction of electrical current can be different from the profiles shown in FIG. 8, such as using linear, logarithmic, or piecewise correlations as described in relation to FIGS. 4A-4D. In some embodiments, the dimming profiles uniquely remove biological light at a faster rate than the white light at high output levels (e.g., 50%-100% of the setpoint) without impacting the overall visual light. This minimal impact on visual light (e.g., brightness, color temperature and/or color rendering index "CRI") occurs because the 480-500 nm wavelength range has less impact on visual light than white light. For example, a 50% reduction in the 480-500 nm peak might only reduce the visual brightness (lumens) by 10%. This higher rate of removal in biological light is demonstrated in FIG. 8 by the wider spacing between the percentage output curves near the 490 nm peak compared to the closer space of the curves in the 600 nm range, for outputs greater than about 50%. In one embodiment, the dimming profile beneficially creates only a 500 K shift from full output to a fully dimmed output, such as shifting from a 4000 K daytime spectrum with CRI=86, cyanosis observation index (COI)=3.0 and M/P=0.95 at full output (setpoint) to a 3500 K nighttime spectrum with CRI=83 and M/P 0.55 at a fully dimmed setting.

In some embodiments, the white light in the spectra used in the dimming profiles include compensation for a 10-degree observer rather than a 2-degree observer as in conventional systems. For example, the spectrum of light from a light emitting apparatus may be engineered (or tailored) to have desired chromaticity coordinates (e.g., in the CIE 1931 color space diagram using the 1964 10° Supplementary Standard Observer). For example, an LED can have an emission spectra with a strong peak in the range of 480 nm to 500 nm and the spectrum of the LED can be tailored such that when the LED is combined with a traditional white LED (e.g., with spectrum 330 shown in FIG. 3) the combined light appears white (e.g., has chromaticity coordinates within the ANSI 4000 K Bin in the CIE 1931 color space diagram). In some embodiments, LEDs with melanopic emission spectra are designed to have vector shifts in their chromaticity coordinates from the CIE 1931 2-degree Standard Observer (i.e., the 2-degree observer) to the CIE 1964 10-degree Standard Observer (i.e., the 10-degree observer) in the CIE 1931 color space diagram, in the negative X and positive Y directions. This is in contrast with traditional white light LEDs which have vector shifts when moving from the 2-degree to the 10-degree observers in the positive X and negative Y directions. In some embodiments, the large shift in the chromaticity coordinates between the 2-degree to the 10-degree observers for LEDs with melanopic emission spectra requires that the 10-degree observer is used when tailoring the chromaticity coordinates of these LEDs. For example, when conventional methods using the 2-degree observer are used to tailor the chromaticity coordinates of light from an LED with a melanopic emission spectrum and light from a white LED, such that the combined light has chromaticity coordinates within a region of the CIE 1931 color space diagram that should appear white, then the combined light will have a color that may not appear white to a typical observer. The combined light may in fact appear slightly greenish, which is commonly considered an undesirable color of light for a white light source intended for lighting applications. In some embodiments, the 10-degree observer color matching functions are better predictors of the actual perceived color of an individual. When the 10-degree observer is used to tailor the chromaticity coordinates of light from the LED combination as described above, then the combined light may appear white to a typical observer and have improved visual aesthetic qualities compared to conventional circadian LED systems.

Figure 9:
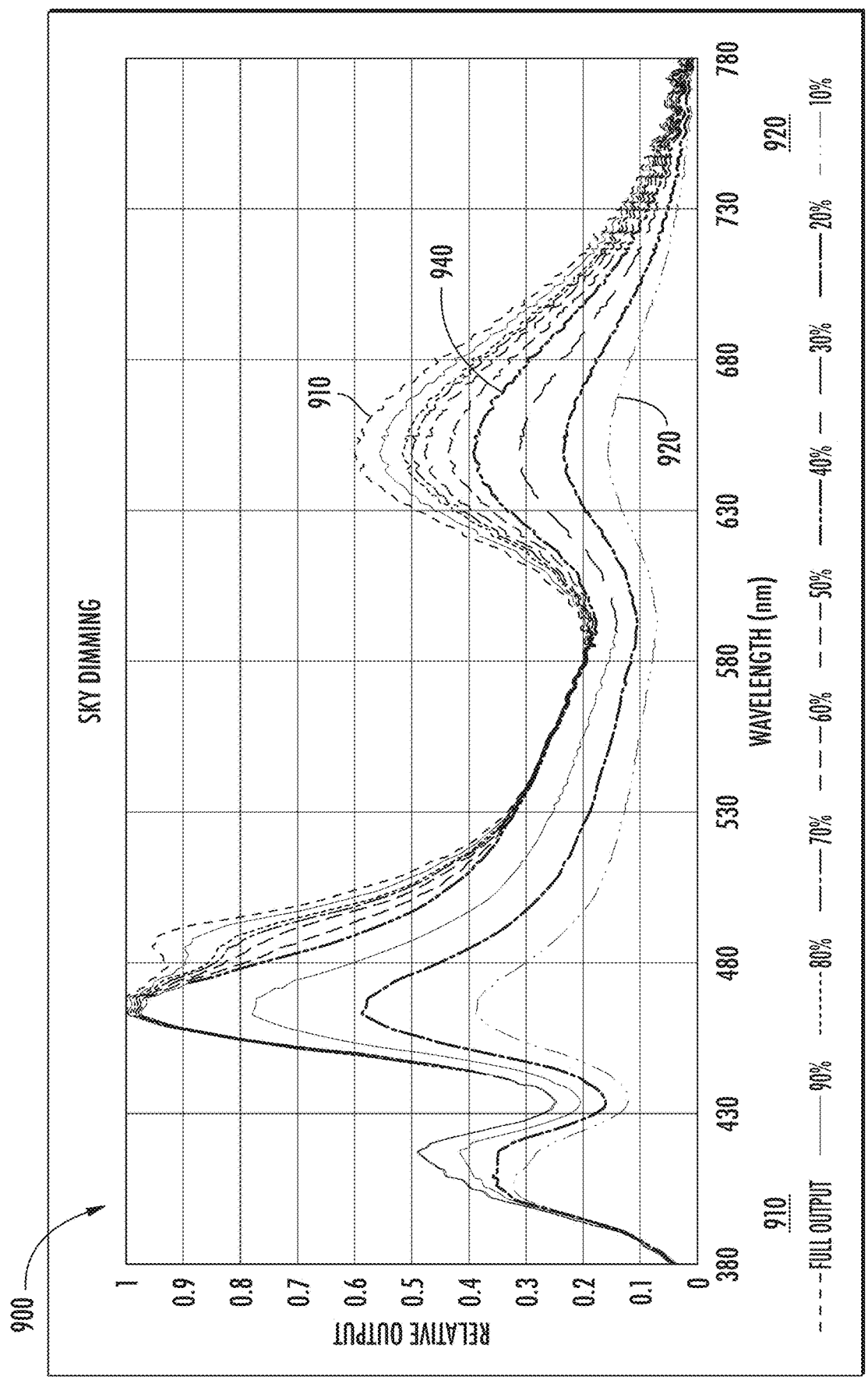
FIG. 9 shows a graph of another biological lighting spectrum and dimming profile, in accordance with some embodiments.

FIG. 9 is a graph 900 showing an embodiment of another biological lighting spectrum that may be used in the dimming profiles of the present disclosure, where the spectrum of graph 900 shall be referred to as "sky-dimming" in this disclosure. This sky-dimming spectrum simulates natural light above the horizon, including a wavelength peak near approximately 380 nm that occurs at twilight. The embodiment of the sky-dimming spectral distribution shown in FIG. 9 includes white light combined with melanopic light in the 480 nm to 500 nm range, sub-dermal stimulation light in the ranges of 650 nm to 670 nm (e.g., 660 nm) and/or 700+ nm, and twilight (i.e., OPN-5 targeted light) in the 370 nm to 410 nm range. The peaks in the ranges of approximately 600 nm to 660 nm and near 460 nm are due to the white light. The melanopic light in some embodiments has a peak wavelength between from 465 nm to 495 nm, with a full-width half maximum from 450 nm to 500 nm. In some embodiments, the sky-dimming profile can be implemented by a 3-channel configuration of 1) a custom chip (e.g., a cold white light spectrum of CCT in a range from 8000 K to 20,000 K, such as about 17,000K, with peaks in emission at 420 nm, 465 nm and 660 nm; and having a maximum peak around 460-470 nm, such as 465 nm), 2) a melanopic LED channel (e.g., 480-500 nm), and 3) an OPN5 LED channel (e.g. 370-410 nm, or 405 nm, or 380 nm). In some embodiments the melanopic LED channel may include white light compensation for a 10-degree observer. In some embodiments, the sky-dimming profile can be implemented by a 2-channel configuration in which the melanopic LED is omitted, such as a 2-channel configuration of the custom chip and the OPN5 LED channel described above.

As can be seen in FIG. 9, the sky-dimming profile of graph 900 maintains a peak in the twilight range (370 nm to 410 nm) throughout all dimming profile settings from the 100% output curve 910 down to the lowest setting curve 920 (10% being the lowest output illustrated in this graph), increasing the OPN5/OPN4 ratio from a minimum value to higher values as dimming occurs per the dimming profile. In some embodiments, the sky-dimming profile 900 may use only a portion of the curves shown in FIG. 9. For example, a full output of 100% maximum current may implement the curve 940 (which is the 40% level of the full graph 900), and the spectrum is adjusted from curve 940 to curve 920 as the current is decreased.

The sky-dimming spectrum of graph 900 provides significant contribution of the twilight wavelengths at both the beginning and the end of the day. In addition, the sky-dimming profile of graph 900 presents a shift in wavelength peaks. OPN5 with peak sensitivity near 380 nm contributes to the delineation of day versus night, providing an amplification of subsequent light exposure (either making brighter days or darker nights). This is important considering that people spend the majority of their time inside under electric lighting that is too dim to be considered day and too bright to be considered night. During twilight, as the sun sets, more atmosphere is between the sun the observer, leading to an increase of Raleigh scattering potential. This leads to a combined reduction in intensity and an increase in the relative proportion of short wavelengths near the peak sensitivity of OPN5. Thus, during operation of dimming full output curve 910 toward low output curve 920, the sky-dimming profile of graph 900 implements a twilight sequence that increases the ratio of OPN5 wavelengths relative to other wavelengths. This increase in the relative amount of 370 nm to 410 nm (e.g., 380 nm) wavelengths as the light is dimmed beneficially provides a more natural twilight scenario than conventional lighting systems. In further embodiments, the sky-dimming spectrum may be used to provide spatial distributions of light. For example, the sky-dimming spectrum may be used to illuminate the ceiling (i.e., uplighting), or may be a stand-alone fixture (e.g., cove), or may be used in an upward portion of an up/down light.

Figure 10:
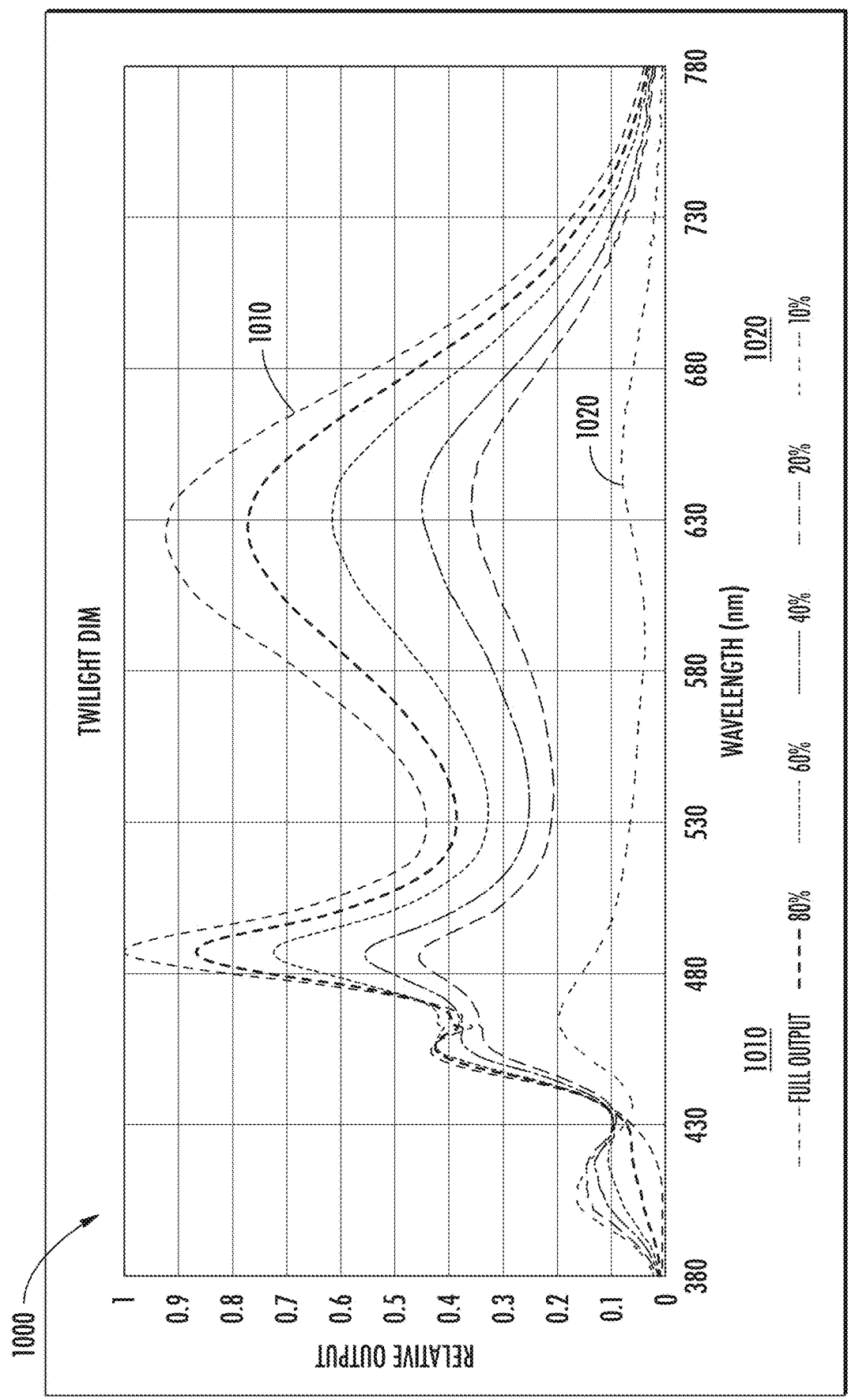
FIG. 10 shows a graph of a further biological lighting spectrum and dimming profile, in accordance with some embodiments.

FIG. 10 shows a graph 1000 showing an embodiment of a spectrum that shall be referred to as "twilight dim" in this disclosure, that combines the bio-dimming spectrum of graph 800 and sky-dimming spectrum of graph 900 into a single spectrum. Thus, the twilight dim spectrum of graph 1000 is a dimming profile that provides varying melanopic and sub-dermal amounts as well as the 370-410 nm (e.g., 380 nm) OPN5 wavelength at the end of the day. In particular, the proportion of OPN5-targeted light is increased as the current is reduced. That is, the dimming profile correlates an OPN5/OPN4 ratio to a percentage of the maximum current, where the OPN5/OPN4 ratio is a ratio of an OPN5 lux to a melanopic lux and a minimum OPN5/OPN4 ratio is output when the total current is equal to or greater than the setpoint. The twilight dim spectrum of graph 1000 may be used in a single fixture as a downlight or as an uplight. At full output 1010, the melanopic wavelength (480 nm to 500 nm) and sub-dermal component (660 nm, which appears as a peak around 630 nm in combination with white light) are the significant components of the twilight dim, while at greatly dimmed levels (e.g. low output curve 1020 representing 10% output in this example) the twilight wavelength (370 nm to 410 nm) becomes the dominant peak.

Figure 11:
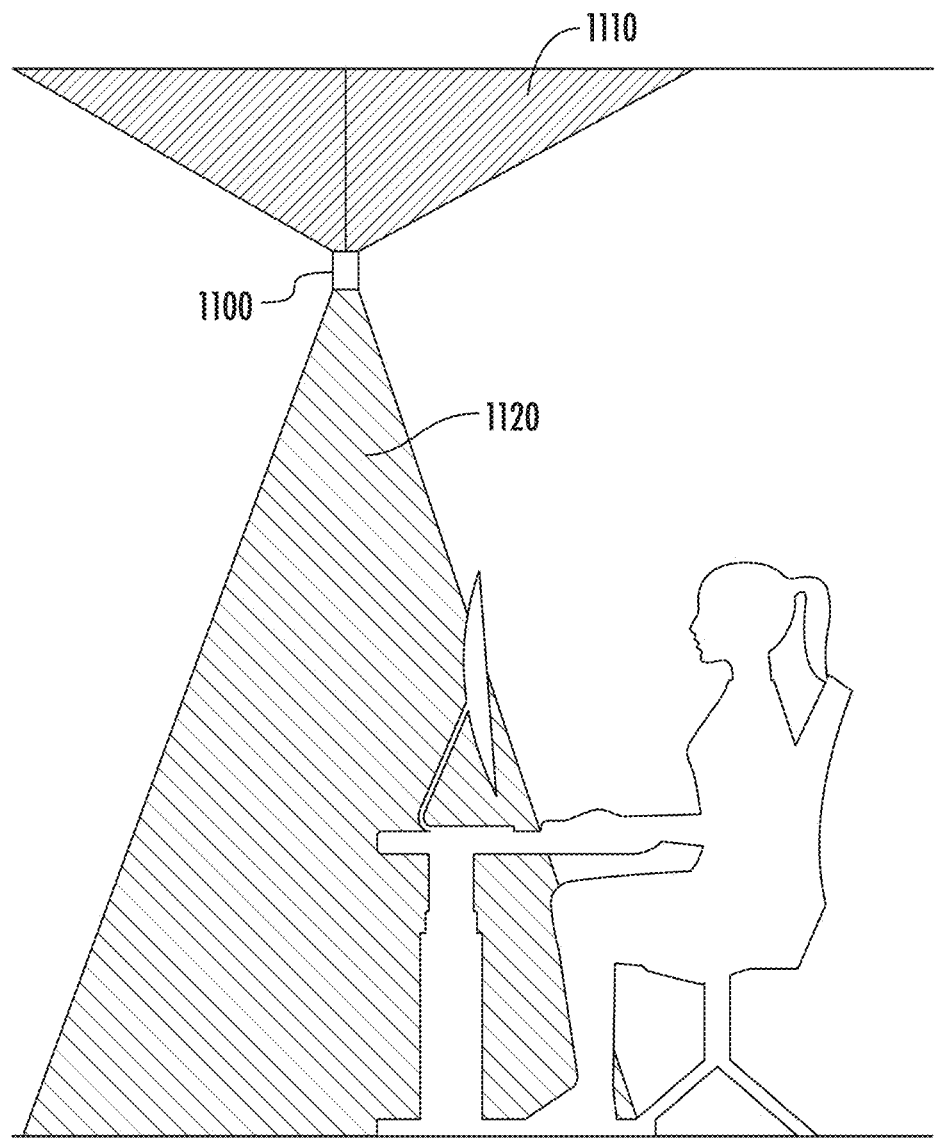
FIG. 11 is a schematic of a biological lighting system with color separation, in accordance with some embodiments.

FIG. 11 shows an example of a biological lighting system being implemented with color separation, in which melanopic (e.g. 490 nm) and twilight (e.g. 380 nm) components are spatially directional. The lighting fixture in this example is a pendant fixture 1100 that has lighting components in both the upward direction (i.e. upward away from the ground) and the downward direction (i.e., downward toward the ground). In one embodiment, the sky-dim profile of FIG. 9 can be used for the uplight 1110 and the bio-dimming profile of FIG. 8 can be used in the downlight 1120. In another embodiment, the twilight-dimming profile of FIG. 10 can be used for the uplight 1110 and the bio-dimming profile of FIG. 8 can be used in the downlight 1120. As light levels are dimmed, the bio-dim profile in the downlight 1120 reduces the melanopic and sub-dermal components, while the sky-dim in the uplight 1110 reduces the melanopic and sub-dermal components but maintains the twilight (OPN5) component. Thus, the twilight 380 nm effect is emanated from above the "horizon" to simulate natural sunlight and to more effectively stimulate optical photoreceptors.

The present embodiments include various combinations of the biological lighting profiles and spatial configurations described herein. In some embodiments, a lighting fixture includes a first LED channel that emits a first spectrum comprising white light and a second LED channel that emits a second spectrum comprising biologically tailored light. The biologically tailored light has a first wavelength peak in a range from 650 nm to 670 nm and a second wavelength peak in a range from 480 nm to 500 nm. In some embodiments, the first wavelength peak and the second wavelength peak in the second spectrum (in the ranges from 650 nm to 670 nm and from 480 nm to 500 nm) are present at the maximum current of the dimming profile. The lighting fixture further may further include a third LED channel that emits a third spectrum having a third wavelength peak in a range from 370 nm to 410 nm. In some embodiments, the first spectrum, the second spectrum and the third spectrum (if present) are all emitted in a downward direction toward the ground. In some embodiments, the dimming profile has a fully dimmed setting in which the third wavelength peak that is in a range from 370 nm to 410 nm is the maximum wavelength peak emitted by the lighting fixture. In some embodiments, as the total current is reduced, the dimming profile increases a proportion of the total current that is delivered to the third wavelength peak that is in the range from 370 to 410 nm emitted from the third LED channel.

In some embodiments, a lighting fixture includes a first LED channel that emits a first spectrum comprising white light, a second LED channel that emits a second spectrum comprising biologically tailored light having a first wavelength peak that is in a range from 650 nm to 670 nm and a second wavelength peak that is in a range from 480 nm to 500 nm, and a third LED channel that emits a third spectrum having a third wavelength peak that is in a range from 370 nm to 410 nm. A microprocessor is configured to take measurements of a first current through the first LED channel, a second current through the second LED channel and a third current through the third LED channel, wherein a sum of the first current and the second current and the third current is the total current. The microprocessor is also configured to set a setpoint based on a plurality of average values of the total current, wherein the setpoint defines a maximum current for a dimming profile of the lighting fixture. The microprocessor is also configured to control an OPN5/OPN4 ratio according to the dimming profile. The dimming profile correlates the OPN5/OPN4 ratio to a percentage of the maximum current, where the OPN5/OPN4 ratio is a ratio of an OPN5 lux to a melanopic lux, and where a minimum OPN5/OPN4 ratio is output when the total current is equal to or greater than the setpoint. In some embodiments, the white light has a color correlated temperature that is in the range from 8000 K to 20,000 K, or from 2700 K to 4000 K. In some embodiments, the first wavelength peak and the second wavelength peak (in the ranges from 650 nm to 670 nm and from 480 nm to 500 nm) of the second spectrum are present when the maximum current of the dimming profile is delivered to the lighting fixture. In some embodiments, the first spectrum, the second spectrum and the third spectrum are all emitted in a downward direction. In some embodiments, the first spectrum, the second spectrum and the third spectrum are all emitted in an upward direction away from the ground, where further embodiments may include a second lighting fixture that emits light in a downward direction toward the ground, the second lighting fixture including i) a fourth LED channel that emits a fourth spectrum comprising white light and ii) a fifth LED channel that emits a fifth spectrum comprising biologically tailored light having a fourth wavelength peak in a range from 650 nm to 670 nm and a fifth wavelength peak in a range from 480 nm to 500 nm. In some embodiments, the dimming profile implements the fully dimmed setting according to a time of day. In some embodiments, at the maximum current, a combined spectrum from the first spectrum, the second spectrum and the third spectrum is tailored to have chromaticity coordinates within the ANSI 3000 K to 6500 K Bin to an International Commission on Illumination (CIE) 1964 10-degree Standard Observer.

In some embodiments, a lighting control system includes a lighting fixture, a single dimmer control and a microprocessor. The lighting fixture includes a first LED channel that emits a first spectrum comprising white light and a second LED channel that emits a second spectrum comprising a wavelength peak in a range from 370 nm to 410 nm. The single dimmer control enables a user to adjust a total current to the lighting fixture. The microprocessor is configured to a) take measurements of a first current through the first LED channel and a second current through the second LED channel, where a sum of the first current and the second current is the total current; b) set a setpoint based on a plurality of average values of the total current, where the setpoint defines a maximum current for a dimming profile of the lighting fixture; and c) control an OPN5/OPN4 ratio according to the dimming profile. The dimming profile correlates the OPN5/OPN4 ratio to a percentage of the maximum current, where the OPN5/OPN4 ratio is a ratio of an OPN5 lux to a melanopic lux, and where a minimum OPN5/OPN4 ratio is output when the total current is equal to or greater than the setpoint. In some embodiments, a melanopic to photopic ratio (M/P ratio) is changed according to the dimming profile by adjusting a first proportion of the total current to the first LED channel and a second proportion of the total current to the second LED channel. In some embodiments, the microprocessor is configured to set the setpoint by decreasing the setpoint when a largest of the plurality of average values over a first time interval is less than an existing setpoint, and increasing the setpoint when the largest of the plurality of average values over a second time interval is greater than the existing setpoint, where the second time interval is less than the first time interval. For example, the first time interval may be from 24 to 26 hours and the second time interval may be from 1 to 4 hours. In some embodiments, the first spectrum and the second spectrum are all emitted in an upward direction away from the ground.

Figure 15:
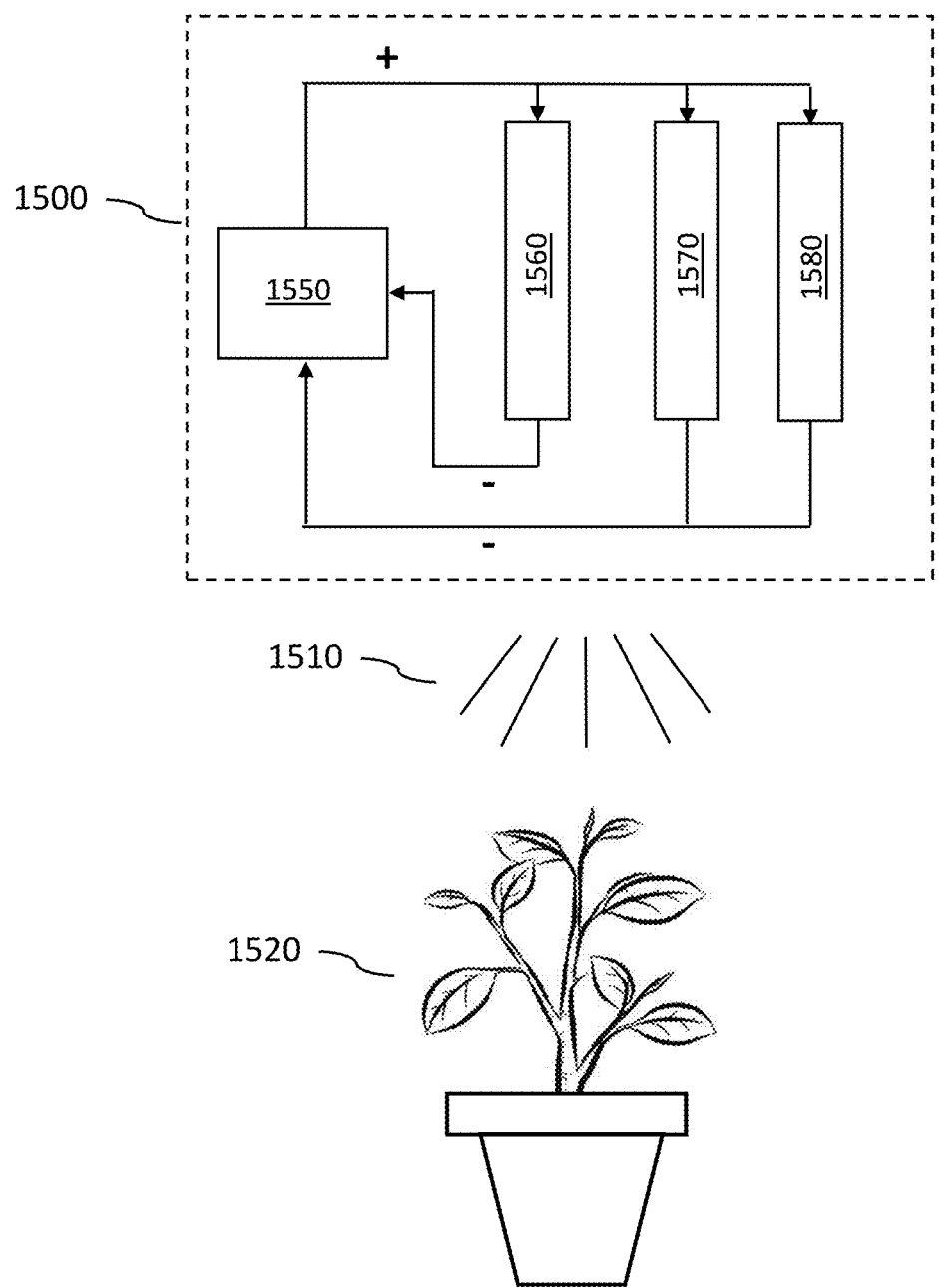
FIG. 15 is a schematic representing a lighting system for plant growth, in accordance with some embodiments.

In some embodiments as shall be described in relation to FIG. 15, biological light may be delivered that is pertinent to plant growth. A blue-enriched morning has been shown to increase leaf rigidity signaling an amplification of circadian amplitude. Similarly, a blue-enriched morning has been shown to result in an increase in nighttime melatonin production signaling an increase in circadian amplitude. Thus, a blue-enriched morning can elicit a circadian amplitude effect. Moreover, plants exhibit melatonin, where plant melatonin is associated with higher plant resilience to stress and predators. Some embodiments of the present disclosure uniquely utilize dynamic spectrums that elicit a circadian amplitude response in plants, which results in better leaf rigidity and also results in increased melatonin concentration, increased plant resilience, increased plant nutrition, and/or increased stomatal activity.

Furthermore, phototropism is a plant's ability to move in the direction of more light availability. This effect is a blue light response. The evolutionary reasoning for this is that a plant will determine that bluer light is a direction of more light availability. However, plants will only exhibit phototropism when they are in an environment where there is not enough blue light. Experimental data suggests this threshold is around 30 µmol/m$^2$ of blue light (400 nm to 500 nm). In other words, if sufficient blue light is supplied, the plant will exhibit normal growth behavior. If there is insufficient blue light, the plant will stretch out in search for more blue light. This stretching behavior compromises the plant's vitality, making their stems weaker. This need for blue light in plants creates a dilemma in trying to supply energy-efficient lighting for plant growth. Red light is far more efficient than blue light for generating photosynthesis. Thus, creating an optimal plant spectrum is conventionally achieved by having the most red in the spectrum while still meeting this blue light criteria. However, this criteria does not need to be met the entire day. Discovery in the industry of a novel twilight (TWL) gene showcases that this blue light phototropic effect is most sensitive around the beginning and end of day. In accordance with some embodiments, a spectrum is created to have the blue enrichment at the beginning and end of day only.

Additionally, the phytochrome photostationary state is useful for altering photoperiodism. The amount of red light to far-red light will change the state of the plant from daytime to night. At the beginning and end of the day, during twilight, there exists much more far-red light than red light, and thus the phytochrome photostationary state is more weighted in the far-red which signals night to the plant. When this switches to the red state, this signals to the plant that it is daytime.

Other plant responses exist, such as anthocyanin responses and the Emerson enhancement effect, which are ultraviolet and far-red driven responses, respectively. These responses may also exhibit time of day sensitivity that would be critical to control to maximize system energy efficiency.

Referring to FIG. 15, a lighting system 1500 can implement light 1510 having spectral components and/or spectral dimming profiles that are beneficial for plant growth 1520, in accordance with some embodiments. Lighting system 1500 includes a multi-channel current controller, which shall be referred to as a microprocessor 1550, that divides a total current between one or more LED channels. In FIG. 15, a first LED channel 1560, a second LED channel 1570, and a third LED channel 1580 are illustrated. First LED channel 1560 may be configured to emit a first spectrum comprising white light. Second LED channel 1570 may be configured to emit a biological spectrum for plant growth, such as a second spectrum having a second wavelength peak in a range from 700 nm to 800 nm (far-red light) and/or 400 nm to 500 nm (blue light). In some embodiments, second LED channel 1570 may be configured to emit a second wavelength peak in a range from 700 nm to 800 nm, and third LED channel 1580 may be configured to emit a third wavelength peak in a range from 400 nm to 500 nm. Microprocessor 1550 stores spectral dimming profiles in which a ratio of the second current (and/or a third current from a third LED channel 1580) includes biologically tailored light for plants. Microprocessor 1550 may also be configured for a dual-mode control system as described in FIGS. 12-14 to allow a user to turn a spectrum mode on/off and to control an intensity for the lighting system 1500 via a dimmer control.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A lighting control system comprising:
   an electronic processing circuit configured to:
   detect a rate at which a total current from a current driver is being changed, wherein the total current is an amount of current for a plurality of light emitting diode (LED) channels, the plurality of LED channels comprising a first LED channel and a second LED channel; and
   control a first current to the first LED channel and a second current to the second LED channel, the first current and the second current each being a portion of the total current, wherein the controlling comprises:
   i) when the rate is detected as being a first slope, changing a ratio of the second current to the first current; and
   ii) when the rate is detected as being a second slope different from the first slope, keeping the ratio constant while the total current is adjusted according to a dimmer control;
   wherein the first slope and the second slope are pre-established values.

2. The lighting control system of claim 1 wherein the electronic processing circuit is further configured to change the ratio between a first predefined value and a second predefined value when the rate is detected as being the first slope, the first slope indicating that a spectrum mode has been changed.

3. The lighting control system of claim 1 wherein the electronic processing circuit is further configured to:
   set the ratio of the second current to the first current to a predefined value that includes biologically tailored light emitted from the second LED channel when a spectrum mode is on; and
   reduce the biologically tailored light from the predefined value when the spectrum mode is off.

4. The lighting control system of claim 3 wherein the electronic processing circuit is further configured to, when the spectrum mode is turned from on to off:
   a) decrease the ratio of the second current to the first current; and
   b) reduce the total current at the first slope by a compensation amount, the compensation amount being based on a difference in efficiency between the biologically tailored light emitted from the second LED channel and white light emitted from the first LED channel.

5. The lighting control system of claim 1 wherein the electronic processing circuit is further configured to:
   detect an amount of change of the total current;
   compare the amount of change to a compensation amount; and
   change the ratio of the second current to the first current between a first predefined value and a second predefined value if the amount of change is equal to the compensation amount, indicating that a spectrum mode has been changed.

6. The lighting control system of claim 1 wherein:
   the first LED channel emits a first spectrum comprising white light; and
   the second LED channel emits a second spectrum comprising biologically tailored light having a first wavelength peak in a range from 650 nm to 670 nm and a second wavelength peak in a range from 480 nm to 500 nm.

7. The lighting control system of claim 1 wherein:
   the first LED channel emits a first spectrum comprising white light; and
   the second LED channel emits a second spectrum comprising biologically tailored light having a wavelength peak in a range from 700 nm to 800 nm.

8. The lighting control system of claim 1 wherein:
   the first LED channel emits a first spectrum comprising white light; and
   the second LED channel emits a second spectrum comprising biologically tailored light having a wavelength peak in a range from 400 nm to 500 nm.

9. The lighting control system of claim 1 wherein the electronic processing circuit is a microprocessor, a microcontroller or a field programmable gate array.

10. A method for a lighting control system, the method comprising:
    providing an electronic processing circuit; and
    configuring the electronic processing circuit to:
    detect a rate at which a total current from a current driver is being changed, wherein the total current is an amount of current for a plurality of light emitting diode (LED) channels, the plurality of LED channels comprising a first LED channel and a second LED channel; and
    control a first current to the first LED channel and a second current to the second LED channel, the first current and the second current each being a portion of the total current, wherein the controlling comprises:
    i) when the rate is detected as being a first slope, changing a ratio of the second current to the first current; and
    ii) when the rate is detected as being a second slope different from the first slope, keeping the ratio constant while the total current is adjusted according to a dimmer control;
    wherein the first slope and the second slope are pre-established values.

11. The method of claim 10 further comprising: configuring the electronic processing circuit to change the ratio between a first predefined value and a second predefined value when the rate is detected as being the first slope, the first slope indicating that a spectrum mode has been changed.

12. The method of claim 10 further comprising: configuring the electronic processing circuit to:
    set the ratio of the second current to the first current to a predefined value that includes biologically tailored light emitted from the second LED channel when a spectrum mode is on; and
    reduce the biologically tailored light from the predefined value when the spectrum mode is off.

13. The method of claim 12 further comprising: configuring the electronic processing circuit to, when the spectrum mode is turned from on to off:
    a) decrease the ratio of the second current to the first current; and
    b) reduce the total current at the first slope by a compensation amount, the compensation amount being based on a difference in efficiency between the biologically tailored light emitted from the second LED channel and white light emitted from the first LED channel.

14. The method of claim 10 further comprising: configuring the electronic processing circuit to:
- detect an amount of change of the total current;
- compare the amount of change to a compensation amount; and
- change the ratio between a first predefined value and a second predefined value if the amount of change is equal to the compensation amount, indicating that a spectrum mode has been changed.

15. A lighting control system comprising:
- a mode selection switch that allows a user to turn a spectrum mode on and off;
- a dimmer control that allows the user to adjust an overall amount of light output from a light engine, the light engine comprising a first light emitting diode (LED) channel and a second LED channel; and
- a controller connected to the mode selection switch and to the dimmer control, wherein the controller outputs a control signal to a current driver, the control signal having a first slope when the mode selection switch is changed between on and off and having a second slope when the dimmer control is adjusted, the first slope being different from the second slope;
- wherein the current driver receives the control signal from the controller and outputs a total current to an electronic processing circuit, wherein the current driver changes the total current at a rate according to the first slope or the second slope based on the control signal;
- wherein the electronic processing circuit:
- detects the rate at which the total current from the current driver is being changed; and
- controls a first current to the first LED channel and a second current to the second LED channel, the first current and the second current each being a portion of the total current, wherein the controlling comprises i) when the rate is detected as being the first slope, changing a ratio of the second current to the first current, and ii) when the rate is detected as being the second slope, keeping the ratio constant while the total current is adjusted according to the dimmer control.

16. The lighting control system of claim 15 wherein the electronic processing circuit is configured to change the ratio between a first predefined value and a second predefined value when the rate is detected as being the first slope, the first slope indicating that the spectrum mode has been changed.

17. The lighting control system of claim 15 wherein:
- the first LED channel emits a first spectrum comprising white light; and
- the second LED channel emits a second spectrum comprising biologically tailored light.

18. The lighting control system of claim 17 wherein the electronic processing circuit is configured to:
- set the ratio of the second current to the first current to a predefined value that includes the biologically tailored light when the spectrum mode is on; and
- reduce the biologically tailored light from the predefined value when the spectrum mode is off.

19. The lighting control system of claim 17 wherein when the spectrum mode is turned from on to off, the electronic processing circuit is configured to:
a) decrease the ratio of the second current to the first current; and
b) reduce the total current at the first slope by a compensation amount, the compensation amount being based on a difference in efficiency between the biologically tailored light and the white light.

20. The lighting control system of claim 15 wherein the controller is configured to buffer a user adjustment rate of the dimmer control, wherein the first slope or the second slope of the control signal from the controller to the current driver is independent of the user adjustment rate.

21. The lighting control system of claim 15 wherein when the dimmer control is adjusted by the user from a first level to a second level, the controller is configured to change the total current from the current driver at the second slope, from the first level to the second level, while the ratio of the second current to the first current remains constant.

* * * * *